US011272423B2

(12) United States Patent
Ananthanarayanan et al.

(10) Patent No.: US 11,272,423 B2
(45) Date of Patent: Mar. 8, 2022

(54) LIVE VIDEO ANALYTICS OVER HIGH FREQUENCY WIRELESS NETWORKS

(71) Applicant: Microsoft Technology Licensing, LLC, Redmond, WA (US)

(72) Inventors: Ganesh Ananthanarayanan, Seattle, WA (US); Yuanchao Shu, Kirkland, WA (US); Paramvir Bahl, Bellevue, WA (US); Longfei Shangguan, Bellevue, WA (US); Zhuqi Li, Princeton, NJ (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/862,465

(22) Filed: Apr. 29, 2020

(65) Prior Publication Data
US 2021/0345222 A1 Nov. 4, 2021

(51) Int. Cl.
*H04W 40/24* (2009.01)
*H04L 12/26* (2006.01)
(Continued)

(52) U.S. Cl.
CPC ....... *H04W 40/248* (2013.01); *H04L 43/0882* (2013.01); *H04L 45/02* (2013.01);
(Continued)

(58) Field of Classification Search
None
See application file for complete search history.

(56) References Cited

U.S. PATENT DOCUMENTS

2013/0136038 A1* 5/2013 Spagnolini .............. H04L 5/005
370/280
2016/0100442 A1* 4/2016 Xu ....................... H04W 68/005
370/329
(Continued)

OTHER PUBLICATIONS

"Amazon Go", Retrieved From: https://web.archive.org/web/20210127070258/https://www.amazon.com/b?e=UTF8&node=16008589011, Retrieved on: Jan. 27, 2021, 3 Pages.
(Continued)

*Primary Examiner* — Eunsook Choi
(74) *Attorney, Agent, or Firm* — Faegre Drinker Biddle & Reath LLP

(57) ABSTRACT

A multi-hop relay network comprises a set of data nodes arranged in a relay topology, wherein the set of data nodes communicate with one another via a data plane comprising a set of high frequency data links, such as mmWave links. An edge node communicates with one or more of the set of data nodes via the data plane and communicates with the set of data nodes over a control plane comprising a set of low frequency wireless links, such as a Wi-Fi network. The edge node determines a path utilization for the set of high frequency wireless links. When one of the high frequency wireless links is over-utilized, the edge node communicates, to a data node in the set of data nodes via the control plane, a command to change the relay topology. The edge node also determines whether the relay topology is operating at a target accuracy. When it is not, the edge node adjusts a data analytics parameter for a node to improve the overall accuracy of the network.

20 Claims, 12 Drawing Sheets

(51) Int. Cl.
    H04W 88/04      (2009.01)
    H04W 84/18      (2009.01)
    H04L 45/02      (2022.01)
    H04L 43/0882    (2022.01)
    H04W 40/12      (2009.01)
    H04W 24/08      (2009.01)
    H04L 45/48      (2022.01)

(52) U.S. Cl.
    CPC ............. *H04L 45/48* (2013.01); *H04W 24/08* (2013.01); *H04W 40/12* (2013.01); *H04W 40/246* (2013.01); *H04W 84/18* (2013.01); *H04W 88/04* (2013.01)

(56) References Cited

U.S. PATENT DOCUMENTS

| | | | |
|---|---|---|---|
| 2017/0070937 A1* | 3/2017 | Li | H04W 36/0058 |
| 2018/0054772 A1 | 2/2018 | Tan | |
| 2019/0068996 A1 | 2/2019 | Ananthanarayanan et al. | |
| 2019/0364492 A1* | 11/2019 | Azizi | H04W 52/0264 |

OTHER PUBLICATIONS

"AWS Outposts", Retrieved From: https://aws.amazon.com/outposts/, Retrieved on: Feb. 2, 2021, 11 Pages.
"Azure Stack Edge", Retrieved From: https://azure.microsoft.com/en-us/products/azure-stack/edge/, Retrieved on: Feb. 2, 2021, 16 Pages.
"How to Use Background Subtraction Methods—OpenCV", Retrieved From: https://docs.opencv.org/3.4/d1/dc5/tutorial_background_subtraction.html, Retrieved on: Feb. 2, 2021, 4 Pages.
"IP Video Surveillance Design Guide", Retrieved From: https://web.archive.org/web/20190921033632/https://www.cisco.com/c/en/us/td/docs/solutions/Enterprise/Video/IPVS/IPVS_DG/IPVS-DesignGuide/IPVSchap4.html, Sep. 21, 2019, 36 Pages.
"Lambda Labs", Retrieved From: https://lambdalabs.com/, Retrieved on: Feb. 2, 2021, 3 Pages.
"Logitech Brio Webcam with 4k Ultra HD video", Retrieved From: https://www.logitech.com/en-in/products/webcams/brio-4k-hdr-webcam.960-001105.html, Retrieved on: Feb. 2, 2021, 11 Pages.
"Netgear Nighthawk X10 Smart WiFi Router (AD7200)", Retrieved From: https://www.netgear.com/home/wifi/routers/ad7200-fastest-router, Retrieved on: Feb. 2, 2021, 7 Pages.
"Ngff595a-I, qualcomm atheros qca6320-based 802.11 ad wigig + qca6174-based 802.11a/b/g/n/ac + 4.1 bt m.2 module", Retrieved From: https://lian-mueller.com/qualcomm-atheros-communications-distributor/ngff595a-l.html, Retrieved on: Feb. 2, 2021, 1 Page.
"Solving a MIP Problem", Retrieved From: https://developers.google.com/optimization/mip/integer_opt, Retrieved on Feb. 2, 2021, 9 Pages.
"Terragraph: Solving the Urban Bandwidth Challenge", Retrieved From: https://terragraph.com/, Retrieved on: Feb. 2, 2021, 9 Pages.
Aguayo, et al., "Srcrr: A High Throughput Routing Protocol for 802.11 Mesh Networks (draft)", In MIT, Tech. Rep, Nov. 2005, 9 Pages.
Ananthanarayanan, et al., "Traffic Video Analytics—Case Study Report", In Technical Report of MSR-TR-2019-41, Dec. 2019, 12 pages.
Baig, et al., "Jigsaw: Robust Live 4k Video Streaming", In The Proceedings of 25th Annual International Conference on Mobile Computing and Networking, Oct. 21, 2019, 16 Pages.
Bicket, et al., "Architecture and Evaluation of an Unplanned 802.11b Mesh Network", In Proceedings of the 11th Annual International Conference on Mobile Computing and Networking, Aug. 28, 2005, pp. 31-42.
Biswas, et al., "Opportunistic Routing in Multi-Hop Wireless Networks", In SIGCOMM Computer Communication Review, vol. 34, Issue No. 1, Jan. 2004, pp. 69-74.
Draves, et al., "Routing in Multi-radio, Multi-hop Wireless Mesh Networks", In Proceedings of the 10th Annual International Conference on Mobile Computing and Networking, Sep. 26, 2004, pp. 114-128.
Gnawali, et al., "Collection Tree Protocol", In The Proceedings of 7th ACM Conference on Embedded Networked Sensor Systems, Nov. 4, 2009, 14 Pages.
Haider, et al., "LiSteer: mmWave Beam Acquisition and Steering by Tracking Indicator LEDs on Wireless APs", In Proceedings of the 24th Annual International Conference on Mobile Computing and Networking, Oct. 29, 2018, 16 Pages.
Harwell, et al., "Inside Amazon Go: The camera-filled convenience store that watches you back", Retrieved From https://www.washingtonpost.com/news/business/wp/2018/01/22/inside-amazon-go-the-camera-filled-convenience-store-that-watches-you-back/, Jan. 23, 2018, 3 Pages.
Harwell, et al., "Microsoft Rocket Video Analytics Platform", Retrieved From: https://github.com/microsoft/Microsoft-Rocket-Video-Analytics-Platform, Sep. 19, 2020, 6 Pages.
Hassanieh, et al., "Fast Millimeter Wave Beam Alignment", in Proceedings of the Conference of the ACM Special Interest Group on Data Communication, Aug. 20, 2018, pp. 432-445.
Hsieh, et al., "Focus: Querying Large Video Datasets with Low Latency and Low Cost", In Proceedings of 13th Symposium on Operating Systems Design and Implementation, Oct. 8, 2018, pp. 269-286.
Jiang, et al., "Chameleon: Scalable Adaptation of Video Analytics", In Proceedings of the Conference of the ACM Special Interest Group on Data Communication, Aug. 20, 2018, pp. 253-266.
Jiang, et al., "Mainstream: Dynamic Stem-sharing for Multi-tenant Video Processing", In Proceedings of the USENIX Annual Technical Conference (USENIX ATC '18), Jul. 11, 2018, pp. 29-41.
Kang, et al., "NoScope: Optimizing Neural Network Queries over Video at Scale", In Proceedings of the VLDB Endowment, vol. 10, No. 11, Aug. 2017, pp. 1586-1597.
Karp, Richard M., "Reducibility among Combinatorial Problems", In The Journal of Complexity of Computer Computations, 1972, pp. 85-103.
Lee, et al., "Efficient Geographic Routing in Multihop Wireless Networks", In The Proceedings of 6th ACM International Symposium on Mobile ad hoc Networking and Computing, May 25, 2005, pp. 230-241.
Mazaheri, et al., "A Millimeter Wave Network for Billions of Things", In The Proceedings of ACM Special Interest Group on Data Communication, Aug. 19, 2019, pp. 174-186.
Ongaro, et al., "In Search of an Understandable Consensus Algorithm", In Proceedings of The USENIX Annual Technical Conference, Jun. 19, 2014, pp. 305-319.
Palacios, et al., "Adaptive Codebook Optimization for Beam Training on Off-the-Shelf IEEE 802.11ad Devices", In Proceedings of the 24th Annual International Conference on Mobile Computing and Networking, Oct. 29, 2018, pp. 241-255.
Redmon, et al., "YOLOv3: An Incremental Improvement", In Repository of arXiv: 1804.02767, Apr. 8, 2018, 6 Pages.
Růžička, et al., "Fast and Accurate Object Detection in High Resolution 4K and 8K Video Using GPUs", In The Proceedings of IEEE High Performance extreme Computing Conference (HPEC), Sep. 25, 2018, 7 Pages.
Salleh, et al., "Multiprocessor Scheduling Problem", In Book Numerical Simulations and Case Studies Using Visual C++.Net, May 27, 2005.
Singh, et al., "Throughput Optimal Decentralized Scheduling of Multihop Networks With End-to-End Deadline Constraints: Unreliable Links", In The Proceedings of The IEEE Transactions on Automatic Control, vol. 64, Issue No. 1, Jan. 2019, pp. 127-142.
Stone, William, "Electromagnetic Signal Attenuation in Construction Materials", In The Publications of NIST Interagency/Internal Report (NISTIR)—6055, Oct. 1, 1997, 200 Pages.
Sur, et al., "60 GHz Indoor Networking through Flexible Beams: A Link-Level Profiling", In Proceedings of the ACM SIGMETRICS International Conference on Measurement and Modeling of Computer Systems, Jun. 15, 2015, pp. 71-84.

(56) References Cited

OTHER PUBLICATIONS

Sur, et al., "Beamspy: Enabling Robust 60 ghz Links Under Blockage", In Proceedings of The 13th USENIX Symposium on Networked Systems Design and Implementation, Mar. 16, 2016, pp. 193-206.

Sur, et al., "WiFi-Assisted 60 GHz Wireless Networks", In Proceedings of the 23rd Annual International Conference on Mobile Computing and Networking, Oct. 16, 2017, pp. 28-41.

Wei, et al., "Facilitating Robust 60 GHz Network Deployment By Sensing Ambient Reflectors", In Proceedings of the 14th USENIX Symposium on Networked Systems Design and Implementation, Mar. 27, 2017, pp. 213-226.

Wei, et al., "Pose Information Assisted 60 GHz Networks: Towards Seamless Coverage and Mobility Support", In Proceedings of the 23rd Annual International Conference on Mobile Computing and Networking, Oct. 16, 2017, pp. 42-55.

Wilson, Robert, "Propagation Losses Through Common Building Materials 2.4 GHz vs 5 GHz", Published by Magis Network, Inc., Aug. 2002, 49 Pages.

Wiltse, James C., "Corrections to Published Curves for Atmospheric Attenuation in the 10 to 1000 GHz RFegion", In The Proceedings of IEEE Antennas and Propagation Society International Symposium 1997, Digest, vol. 4, Jul. 13, 1997, pp. 2580-2583.

Xu, et al., "Supporting Video Queries on Zero-Streaming Cameras", In Repository of arXiv:1904.12342v2, Apr. 30, 2019, 15 Pages.

Zhang, et al., "Joint Face Detection and Alignment Using Multitask Cascaded Convolutional Networks", In the Proceedings of IEEE Signal Processing Letters, vol. 23, Issue No. 10, Oct. 2016, pp. 1499-1503.

Zhang, et al., "Live Video Analytics at Scale with Approximation and Delay-Tolerance", In Proceedings of The14th USENIX Symposium on Networked Systems Design and Implementation, Mar. 27, 2017, pp. 377-392.

Zhang, et al., "The Design and Implementation of a Wireless Video Surveillance System", In Proceedings of the 21st Annual International Conference on Mobile Computing and Networking, Sep. 7, 2015, pp. 426-438.

Zhou, et al., "EAST: An Efficient and Accurate Scene Text Detector", In Proceedings of the IEEE conference on Computer Vision and Pattern Recognition, 2017, pp. 2642-2651.

Zhou, et al., "Following the Shadow: Agile 3-D Beam-Steering for 60 GHz Wireless Networks", In The Proceedings of IEEE Conference on Computer Communications, Apr. 16, 2018, pp. 2375-2383.

Zhu, et al., "Demystifying 60Ghz Outdoor Picocells", In Proceedings of the 20th Annual International Conference on Mobile Computing and Networking, Sep. 7, 2014, pp. 5-16.

Salleh, et al., "Multiprocessor Scheduling Problem", In Book of Numerical Simulations and Case Studies Using Visual C++.Net, May 27, 2005, pp. 247-279.

"DELL Grade A Laptop E7440 Intel Core i5 4th Gen 4300U (1.90 GHz) 16 GB Memory 500 GB SSD 14.0" Windows 10 Pro 64-Bit, Retrieved From: https://web.archive.org/web/20210211072911/ https://www.newegg.com/dell-e7440/p/N82E16834854408?item-9SIAKEN9FN9992&source=region&nm_mc=knc-googlemkp-pc&cm_mmc=knc-googlemkp-pc-_-pla-advanced+computers-_-notebooks-_-9SIAKEN9FN9992, Retrieved On: Feb. 11, 2021, 3 Pages.

Koslowski, et al., "SDN Orchestration to Optimize Meshed Millimeter-Wave Backhaul Networks for MEC-enhanced eMBB Use Cases", In Proceedings of the IEEE International Symposium on Broadband Multimedia Systems and Broadcasting, Jun. 6, 2018, 6 Pages.

"International Search Report and Written Opinion Issued in PCT Application No. PCT/US2021/020378", dated Jun. 16, 2021, 32 Pages.

Pirmagomedov, et al., "Facilitating mmWave Mesh Reliability in PPDR Scenarios Utilizing Artificial Intelligence", In Journal of IEEE Access, vol. 7, Dec. 23, 2019, pp. 180700-180712.

\* cited by examiner

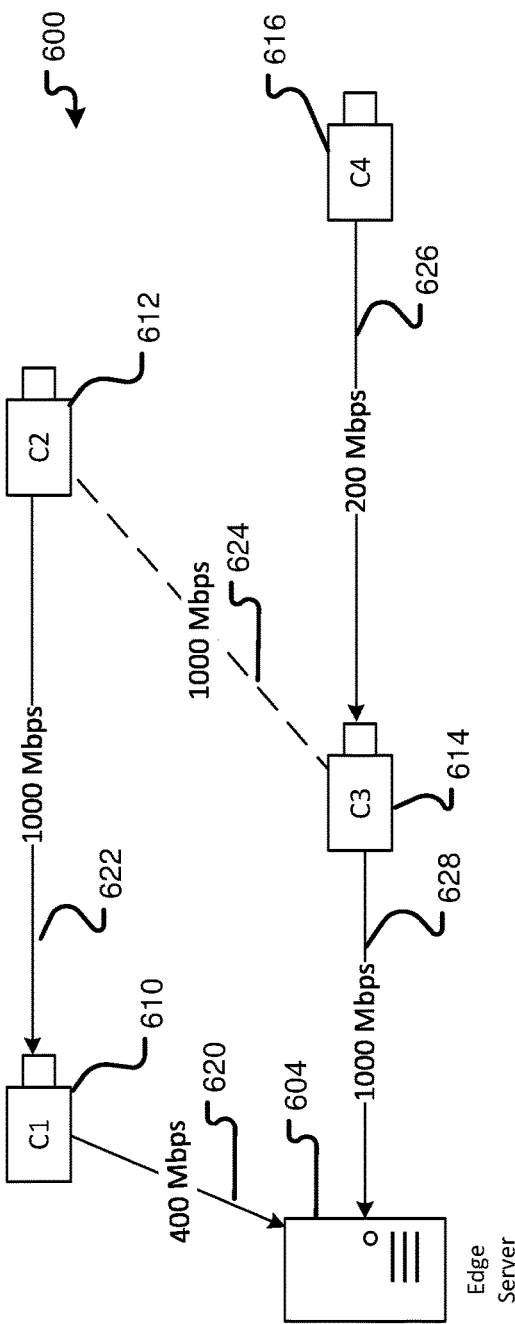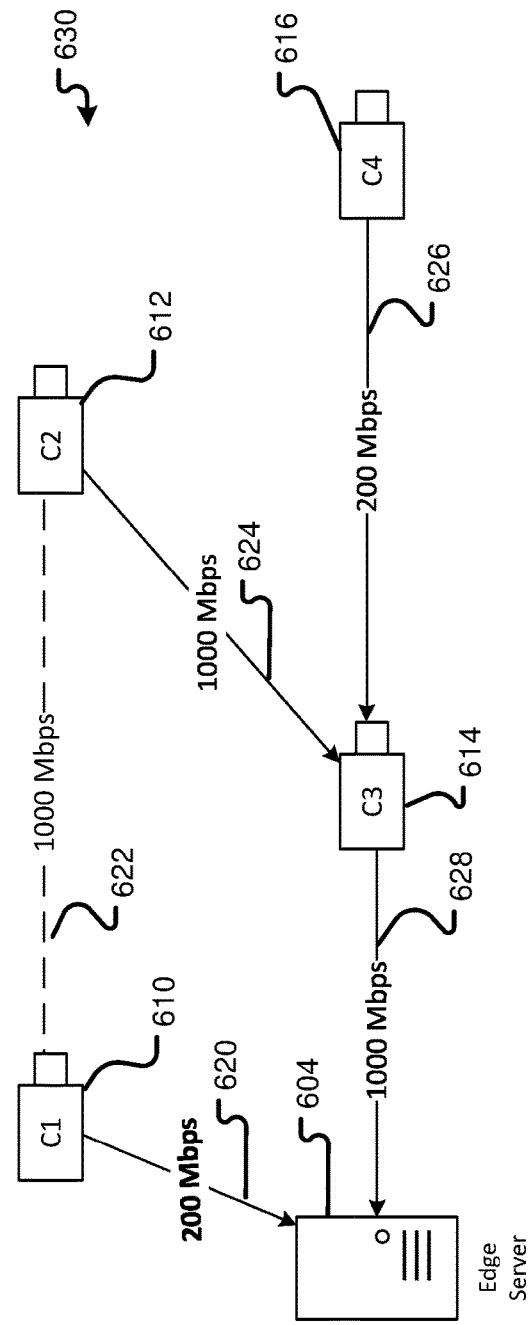
FIG. 6A
FIG. 6B

LIVE VIDEO ANALYTICS OVER HIGH FREQUENCY WIRELESS NETWORKS

BACKGROUND

Massive data analytics networks, such as video camera networks, are now driving innovation in smart retail stores, road traffic monitoring, and security applications, and realizing live data analytics over these networks is an important challenge that Wi-Fi and cellular networks alone cannot solve.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Systems and methods described herein relate to a live data analytics network system that uses a multi-hop, high frequency (e.g., mmWave) wireless relay network. To mitigate link blockage, the network integrates a separate low-latency (e.g., Wi-Fi) control plane with the relay data plane, allowing agile re-routing without suffering the penalty of beam searching for the new route. With the objective of maximizing data analytics accuracy (rather than simply maximizing data throughput), the system uses a novel, scalable flow planning algorithm that operates over hundreds of nodes to simultaneously calculate network routes, load-balance traffic, and allocate bit rates to each node.

More specifically, a multi-hop relay network comprises a set of data nodes arranged in a relay topology, wherein the set of data nodes communicate with one another via a data plane comprising a set of high frequency data links, such as mmWave links. An edge node communicates with one or more of the set of data nodes via the data plane and communicates with the set of data nodes over a control plane comprising a set of low frequency wireless links, such as a Wi-Fi network. The edge node determines a path utilization for the set of high frequency wireless links. When one of the high frequency wireless links is over-utilized, the edge node communicates, to a data node in the set of data nodes via the control plane, a command to change the relay topology. The edge node also determines whether the relay topology is operating at a target accuracy. When it is not, the edge node adjusts a data analytics parameter for a node to improve the overall accuracy of the network.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTIONS OF THE DRAWINGS

Non-limiting and non-exhaustive examples are described with reference to the following figures.

FIGS. 6A and 6B illustrate two alternative topologies of an example multi-hop relay network in accordance of aspects of the present disclosure.

DETAILED DESCRIPTION

Figure 1:
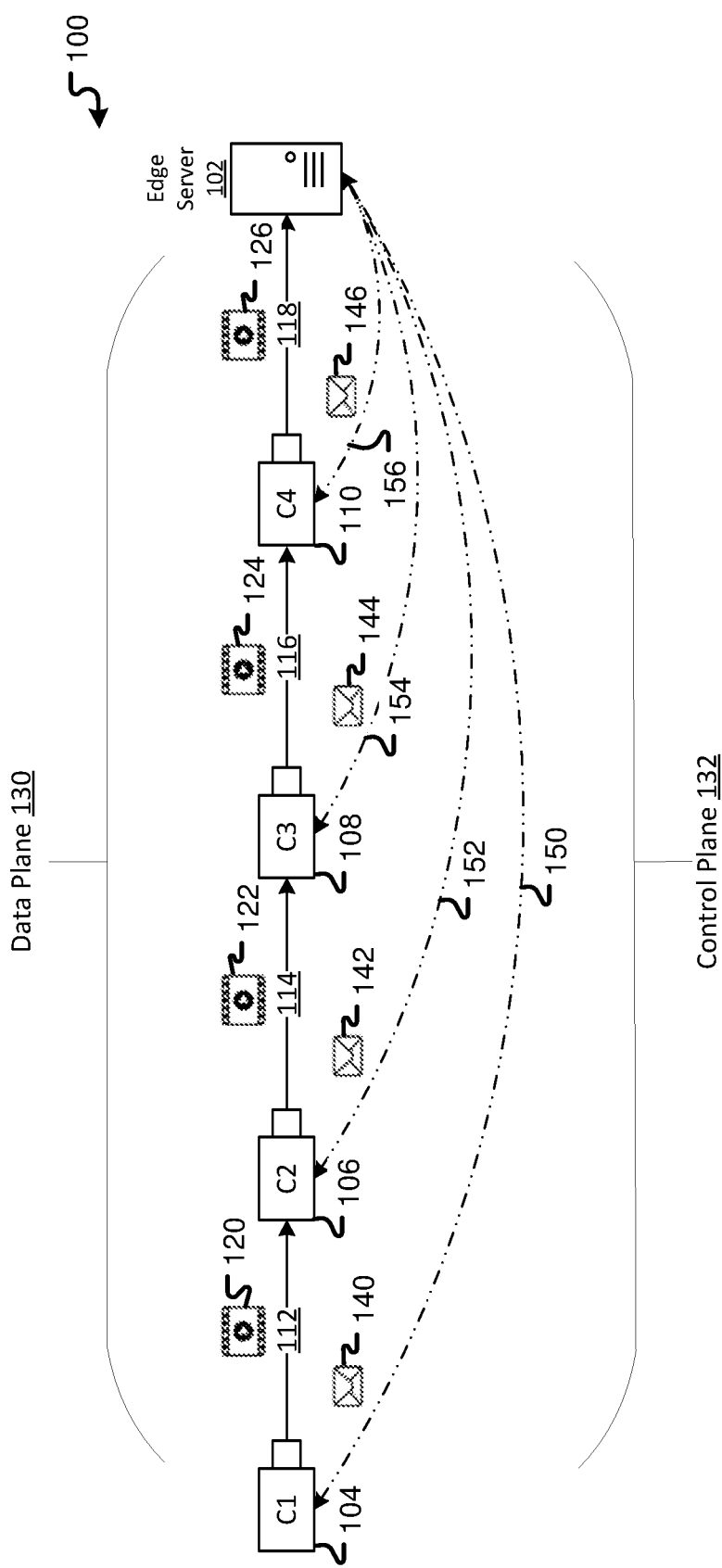
FIG. 1 illustrates an example of a multi-hop relay network in accordance of aspects of the present disclosure.

Various aspects of the disclosure are described more fully below with reference to the accompanying drawings, which from a part hereof, and which show specific example aspects. However, different aspects of the disclosure may be implement in many different forms and should not be construed as limited in the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

Video analytics deployments stream videos to on premise edge servers, which are equipped with GPUs for executing the vision models involved in their processing. Higher resolution cameras (e.g., 4K or 8K) provide higher video analytics accuracy. For example, with more resolution, there are more pixels to work with, which usually leads to higher accuracy in identifying the objects. The need for high video analytics accuracy drives a push for higher resolution (e.g., 4K) and video frame rates (e.g., 60 frames/second). However, these high resolution cameras are not well suited to traditional Wi-Fi networks. Higher resolutions and frame rates drastically increase bit-rate requirements of video streams. Wi-Fi links do not have enough capacity to stream multiple high bit-rate videos (to the edge server for analytics). Indeed transmitting bulky video streams over Wi-Fi links causes crowding of an over-utilized Wi-Fi band and may cause severe interference and delay to other Wi-Fi users. Connecting the cameras with wired networks is cumbersome at scale and also reduces deployment flexibility.

Millimeter-wave ("mmWave") networks (e.g. 5G networks), with capacities of multi-Gbits/second (e.g., 802.11ad WiGig at 60 GHz), are a promising option for streaming high bit-rate videos for video analytics. However, mmWave networks have well-documented limitations: (i) their high throughputs depend on clear line-of-sight, thus making them susceptible to moving objects in the building, and (ii) they have a short range (10-20 meters) and their throughputs drop drastically beyond ca. 10 m, which is considerably shorter than typical distances between cameras and edge servers in typical deployments.

The present disclosure relates to a live data analytic network featuring data nodes, such as video cameras, wireless transceivers/receivers/, cell phones, or the like, and edge nodes both fitted with high range wireless radios, such as a WiGig radio. A multi-hop relay network of the nodes is constructed. Nodes relay their data streams to one of the edge nodes for analytic processing. Nodes that are close to the edge nodes communicate directly with the edge nodes. Farther-away nodes pass their streams to other relay nodes that in turn forward them to the edge node. As a result, network links of the relay nodes closer to the edge nodes will experience higher utilization and congestion. These nodes are not only sending their own data streams to the edge node, but also forwarding data streams from other nodes as well. Further, if one node or link in such a network becomes disconnected as a result of physical blockage or outage, the narrow beam width of that link's radio means that the nodes then have to search for a possible alternate reflection path or alternate route altogether to reconnect the network. This is problematic because the node being connected to may be busy itself with ongoing data transmission, and thus may not know that it is needed to participate in the search. Such a search, during which the data is not relayed, also inevitably affects throughput, latency, and may cause jitter penalties. Furthermore, the required step of broadcasting routing information to each node's neighbors in the mmWave relay network is challenging, because each node's radio has to beam towards each of its neighbors to exchange routing information, which is costly in time. To solve these problems, the present disclosure uses a separate control plane over a lower frequency band network, such as Wi-Fi, which addresses these issues more effectively than the mmWave network used for the data streams.

In the relay network of the present disclosure, in which nodes offer data stream loads into the network, multiple streams need to share a single mmWave link. A scalable flow planning algorithm allocates the capacity of the shared link among individual streams and operates over hundreds of nodes and thousands of multi-hop links among them. For the same reasons mentioned above, the separate control plane disseminates instructions to all the nodes in the network, so that they can implement the routing topology and bit-rate allocations that the flow planning algorithm generates.

A further challenge is the dynamic nature of the mmWave wireless channel, which requires a throughput estimation mechanism to avoid disrupting live data flows. The performance of a data application may depend upon the quality or quantity of data received by the application. For example, the relationship between the bit-rate of the videos and the accuracy of the video analytics outputs is dynamically calculated. However, the present invention does not involve continuous and expensive probing traffic for throughput estimation. Given the directional nature of WiGig links and expensive beam searching to initiate new links, any continuous probing would severely disrupt the flows of live data streams. Instead, a reactive approach to throughput estimation detects when existing links have reduced throughputs or blockage, and only then probes for new links.

The systems disclosed herein periodically profile nodes to obtain the relationship between the bit-rate of the data stream and its impact on the accuracy of the outputs. In doing so, it trades off the timeliness of the video profile for the throughput cost for sending video segments of the highest frame-rate and resolution.

In the present disclosure, flow planning on the multi-hop relay network is optimized to maximize the data analytics accuracy. As a result, routes and link allocations are selected that may be sub-optimal for network throughput but lead to better data, e.g., video, analytics accuracy. Further, a centralized heuristic uses all the link throughputs between nodes and globally optimizes for target accuracy. In aspect, the target accuracy is a maximum possible accuracy. This is in contrast to the decentralized designs where nodes make their own neighbor discovery and routing choices. The present heuristic optimizes both network-layer video stream routing and application-layer video bit-rate allocation. Specifically, it first builds an application-independent routing tree based on the intuition that load balancing among relay nodes yields a higher overall video analytics accuracy. It then leverages the unique throughput-accuracy tradeoff in video analytics (that varies across cameras and with time), and builds a mixed integer linear programming (MILP) model to decide the application-dependent bit-rate configuration to maximize the overall video analytics accuracy.

For the aforementioned reasons, the nodes report link throughputs to a controller in the edge node, while the controller pushes down the routes for the cameras to use along with the video bit-rates to offer. To communicate these control messages, the present disclosure uses a reliable wireless connection, such as for example, 802.11a/b/g/n/ac/ax Wi-Fi, to achieve more reliable dissemination of control information. The control protocols have limited capacity overheads, and thus they do not significantly disrupt existing Wi-Fi traffic. While specific Wi-Fi and WiGig standards are discussed herein, one of skill in the art will appreciate that the systems and methods disclosed herein may be practiced using other wireless data standards.

FIG. 1 illustrates an example multi-hop relay network 100 in accordance with aspects of the present invention. Network 100 divides the messages into two planes—a data plane 130 for streaming data packets, such as video packets, over high frequency data links or high speed wireless links, such as the mmWave network or a 5G network, and a control plane 132 for sending control packets over a lower frequency network or low speed wireless links, such as an 802.11 a/b/g/n/ac/ax Wi-Fi network. In aspects, network 100 has four data nodes C1 104, C2 106, C3 108, and C4 110, which are wirelessly connected to an edge node 102 in a relay topology. In aspects, data nodes C1-C4 are video cameras that are capable of sending and receiving video streams via their WiGig radios over mmWave links. In other aspects, data nodes may be mobile computing devices such as those discussed in connection FIGS. 8A and 8B. In aspects, edge node 102 is an edge server, but may also be a 5G base station. In a relay topology, each data node may serve both as a data producer and a relay to forward other node's data streams. In a relay topology, not all data nodes are directly connected to the edge node 102. A data node may be connected to the edge node through multiple hops (e.g., multiple relay data nodes and links). The solid arrows 112, 114, 116, and 118 illustrate mmWave links between data nodes C1-C4 and edge node 102. For example, node C1 104 sends data packets 120 (e.g., related to as a video stream, audio data stream, etc.) over link 112 to node C2 106. Node C2 106 sends data packets 122 over link 114 to node C3 108. Node C3 108 sends data packets 124 over link 116 to Node C4 110. Node C4 110 sends data packets 126 over link 118 to edge node 102. Because network 200 is a network with a relay topology, multiple data streams may be sent over a high speed data link, such as a mmWave link 120-126. For example, link 114 may send both video streams captured from nodes C1 104 and C2 106 to node C3 108. Node C4 sends video streams captured itself as well as video streams captured by nodes C1 104, C2 106, and C3 108 to the edge node 102.

In addition to the data plane 130 that uses mmWave links for the data streams, network 100 includes a control plane 132 that sends control packets 140, 142, 144, and 146 over low speed or low frequency wireless links, such as bi-directional Wi-Fi links (dashed lines) 150, 152, 154, and 156, to the edge node, respectively. In aspects, data nodes are connected directly to the edge node via the low frequency Wi-Fi links. The overhead of the control packets is typically small so that it does not overwhelm the Wi-Fi network, which is typically used for other functions. By sending control messages over a separate control plane 132, the control messages 140-146 do not disrupt the data streams 120-126 or data plane 130. There are many types of control messages (e.g. packets) that may be sent using the control plane 132 of the instant disclosure. For example, the following types of data packets are sent over the control plane 308: (1) peer-discovery packets to discover nodes in a bootstrapping stage; (2) bitrate-control packets to re-configure bit-rates on a node through the control plane 132; (3) route-control packets to reschedule forwarding paths for data streams; and (4) network-status packets to report link throughput and live data segments to edge nodes.

Figure 2A:
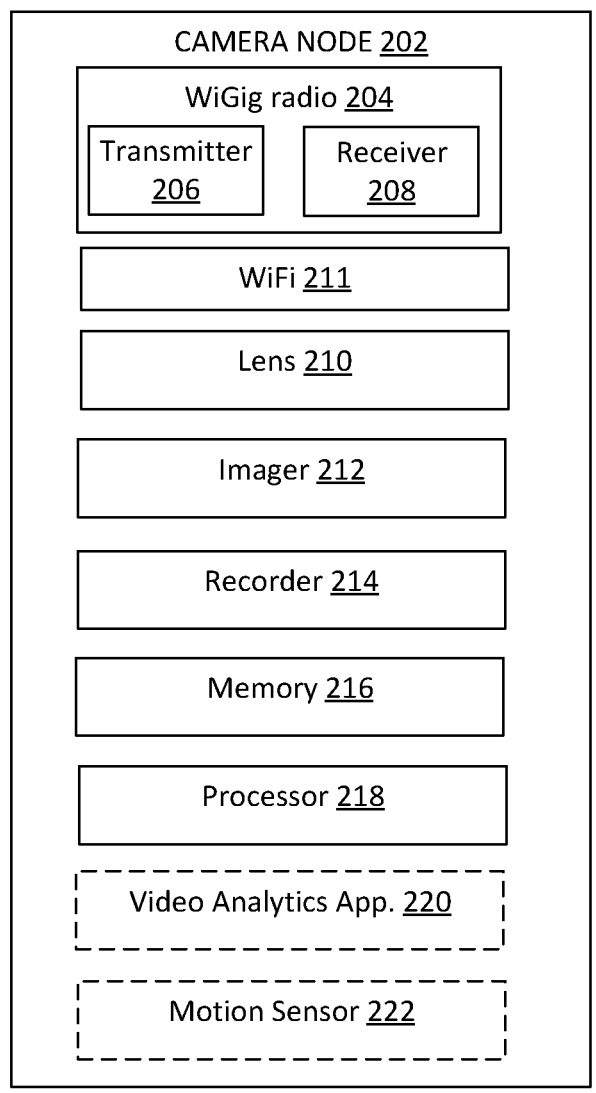
FIG. 2A illustrates an example camera node in accordance of aspects of the present disclosure.

FIG. 2 illustrates an example video camera node 202 according to aspects of the present invention. Camera node 202 is equipped with at least one high frequency band radio 204, such as a WiGig radio, which is capable of transmitting and receiving information over at least mmWave wireless networks. Although FIG. 2A shows one WiGig radio 204 with a transmitter 206 and a receiver 208, in other aspects the node will have one WiGig radio for transmitting and one WiGig radio for receiving. The WiGig radio 204 may be backwards compatible for transmitting both high frequency mmWave signals and lower frequency signals for Wi-Fi connections, such as 802.11ac signals. In other aspects, node 202 also has a Wi-Fi module 211 for transmitting and receiving Wi-Fi signals in lower frequency bands than the mmWave networks. The node 202 also has a lens 210, an imager 212, a recorder 214, memory 216, and a processor 218. Optionally, camera node 202 may also include a video analytics application or engine for analyzing scenes being imaged and streamed and a motion detector 222 for detecting motion in the scene.

Figure 2B:
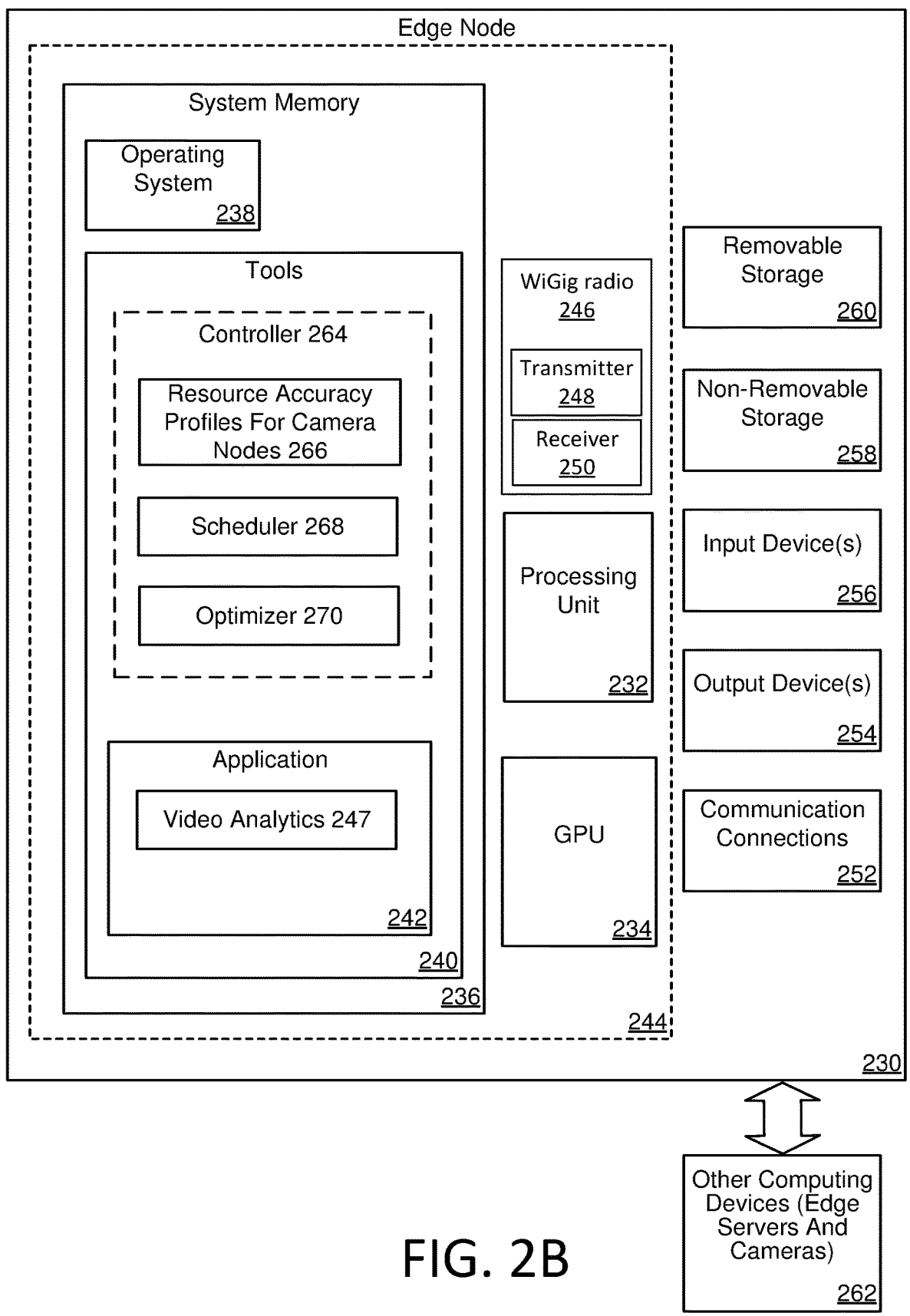
FIG. 2B illustrates an example edge node in accordance of aspects of the present disclosure.

FIG. 2B is a block diagram illustrating physical components (e.g., hardware) of computing device, e.g., an edge node 230, with which aspects of the disclosure may be practiced. Edge node 230 may be a server or a 5G base station or other type of computing device. The computing device components described below may be suitable for the computing devices described above. In a basic configuration, the edge node 230 may include at least one processing unit 232, at least one graphics processing unit (GPU) 234, and a system memory 236. Depending on the configuration and type of computing device, the system memory 236 may comprise, but is not limited to, volatile storage (e.g., random access memory), non-volatile storage (e.g., read-only memory), flash memory, or any combination of such memories. The system memory 236 may include an operating system 238 and one or more program tools 240 suitable for performing the various aspects disclosed herein such. The operating system 238, for example, may be suitable for controlling the operation of the edge node 230. Furthermore, aspects of the disclosure may be practiced in conjunction with a graphics library, other operating systems, or any other application program and is not limited to any particular application or system. This basic configuration is illustrated in FIG. 2B by those components within a dashed line 244.

The edge node 230 may have additional features or functionality. For example, the edge node 230 may also include additional data storage devices (removable and/or non-removable) such as, for example, magnetic disks, optical disks, or tape. Such additional storage is illustrated in FIG. 2B by a removable storage device 260 and a non-removable storage device 258.

The edge node 230 is equipped with at least one high frequency band radio 246, such as a WiGig radio, which is capable of transmitting and receiving information over at least mmWave wireless networks, such as a 5G network. Although FIG. 2B shows one WiGig radio 246 with a transmitter 248 and a receiver 250, in other aspects the node will have one WiGig radio for transmitting and one WiGig radio for receiving.

As stated above, a number of program tools and data files may be stored in the system memory 236. While executing on the processing unit 232, the program tools 240 may perform processes including, but not limited to, the aspects, as described herein. For example, the edge node 230 include video analytics application 247. The GPU 234 executes DNN inference for video processing through the video analytics application 247. Other program tools that may be used in accordance with aspects of the present disclosure may include electronic mail and contacts applications, word processing applications, spreadsheet applications, database applications, slide presentation applications, drawing or computer-aided application programs, etc.

Furthermore, aspects of the disclosure may be implemented using an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 2B may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the edge node 230 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general purpose computer or in any other circuits or systems.

The edge node 230 may also have one or more input device(s) 256, such as a keyboard, a mouse, a pen, a sound or voice input device, a touch or swipe input device, etc. The output device(s) 254 such as a display, speakers, a printer, etc. may also be included. The aforementioned devices are examples and others may be used. The edge node 230 may include one or more communication connections 252 allowing communications with other computing devices 262, such as other edge nodes in the network. Examples of suitable communication connections 252 include, but are not limited to, Wi-Fi transmitter and receiver, radio frequency (RF)

transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program tools. The system memory 236, the removable storage device 260, and the non-removable storage device 258 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the edge node 230. Any such computer storage media may be part of the edge node 230. Computer storage media does not include a carrier wave or other propagated or modulated data signal.

Communication media may be embodied by computer readable instructions, data structures, program tools, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The edge node 230 in FIG. 2B may be the master server in which case it also includes a controller 264, such as controller 106 shown in FIG. 1. The controller 264 handles the topology and global optimization or the entire network. Among other things, the controller dispatches video processing workload among other edge nodes 230 in the network.

For example, the controller 264 utilizes an optimizer 270 to decide which nodes use which links and which streams reach which edge nodes and so forth. In aspects, rather than optimizing to maximize aggregate throughput, the controller 264 maximizes for overall data analytics accuracy. Video analytics is an example of data analytics application. When performing video analytics, the accuracy of the analysis has a relationship based on frame rate and resolution. That is, streaming at a certain frame rate and resolution will yield a certain accuracy, which also has a proportional relationship to throughput. The higher the accuracy the more throughput that is required and the lower the accuracy the less throughput that is required. The controller must also factor in what is being captured by the video cameras. The more activity that is happening in a scene that is being streamed, the higher the resolution that is needed to improve video analytics accuracy. Said another way, accuracy will vary significantly based on resolution when there is a lot of activity is the scene being streamed. On the other hand, if the scene from a camera is relatively empty, the accuracy will not change very much between a lower and a higher resolution. As such, the controller considers for every camera in the system, not only the throughput, but also the scene's relationship to the natural throughput and accuracy. It uses this information to try to optimize for the highest overall accuracy for all cameras in the network.

The network scheduler 268 reschedules network flows when the optimizer 270 decides changes to the network topology need to be made. Changes may need to be made in any number of circumstance, as described in more detail below, but include without limitation interference in a link, equipment problems, an over-utilized link, and a change in scene that requires higher or lower video analytics accuracy. The network scheduler also schedules periodic checks of video accuracy profiles from each node as described in more detail in FIG. 4 and stores the resource accuracy profiles 266.

Figure 3A:
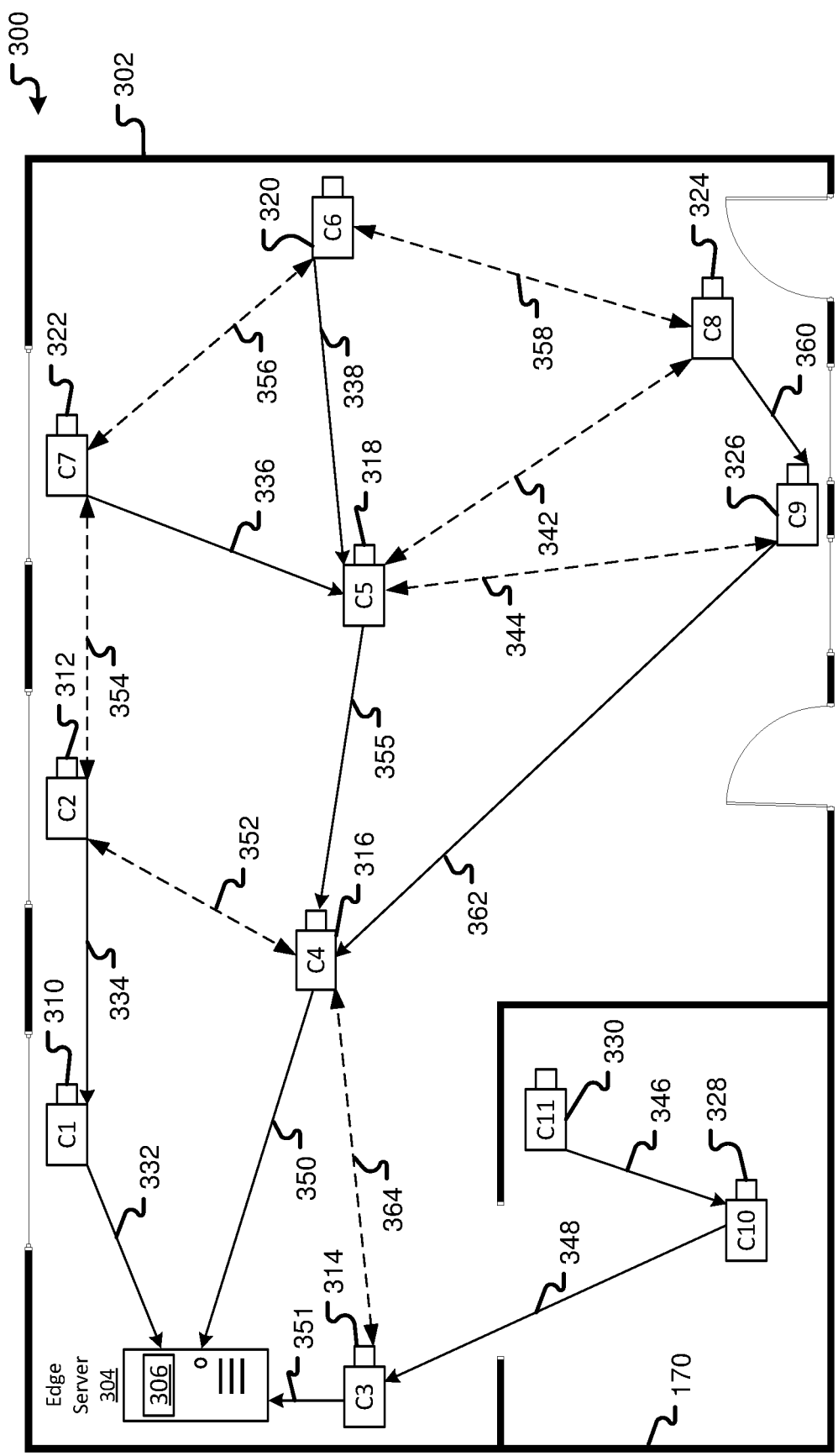
FIGS. 3A-3C illustrate three alternative topologies of an example multi-hop relay network in accordance of aspects of the present disclosure.
Figure 3B:
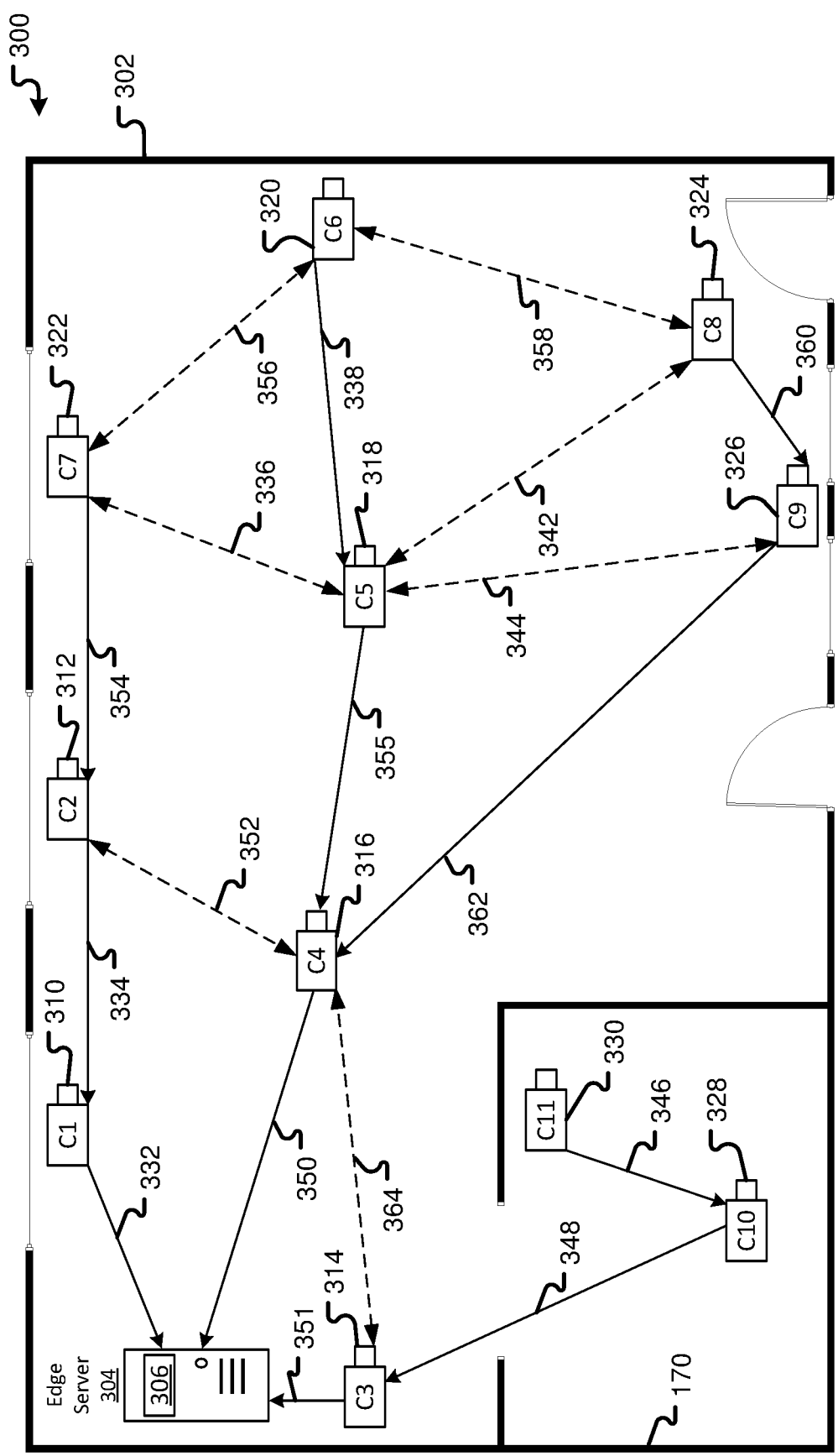
Figure 3C:
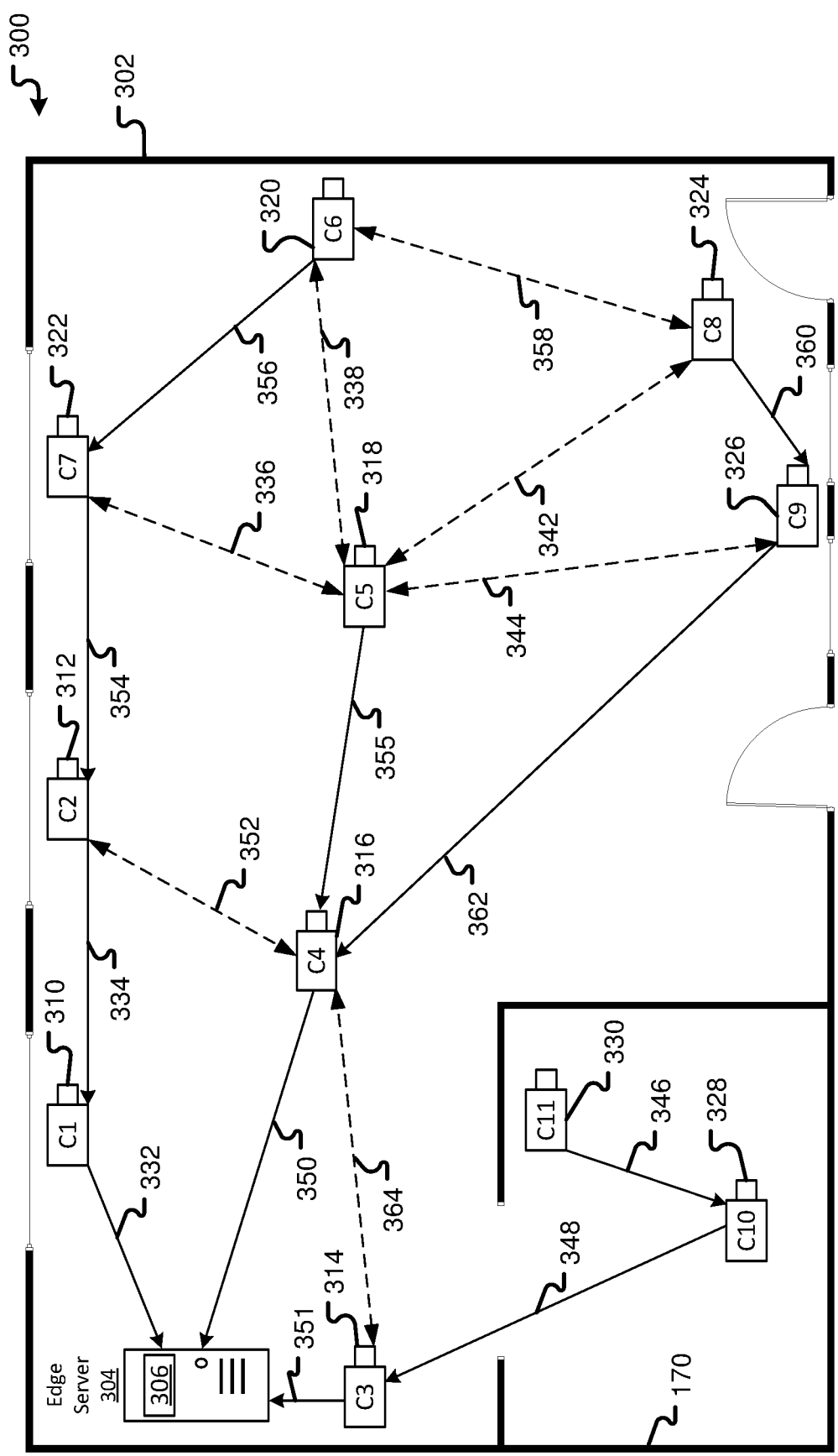

FIGS. 3A-3C show a various example topologies (e.g. which nodes are currently connected to which nodes) in accordance with aspects of the present disclosure.

FIGS. 3A-3C illustrate a building 302 with eleven nodes C1 330, C2 332, C3 334, C4 316, C5 318, C6 320, C7 322, C8 324, C9 326, C10 328, and C11 330 and one master edge node 304. Cameras C10 328 and C11 330 are located within a room 170 within the building 302, such that camera C11 330 does not have line of sight to edge node 304. Although eleven nodes and one edge node are shown, any number of nodes and edge nodes may be deployed as part of the instant disclosure. Typically, edge nodes are connected to each other via a wired network (not shown). The solid unidirectional arrows indicate active mmWave link between nodes. The dashed bi-directional arrows indicate a potential, but un-utilized mmWave link between nodes, which links could go in either direction. A node may utilize one link to send data packets (e.g. video streams) to another node—this is referred to as the upstream link. A node may also receive data packets from multiple nodes—these are referred to as downstream links. In this way, the topologies shown in FIGS. 3A-3C form a tree with the root node comprising the edge node 304.

In aspects, the particular topology is centrally controlled by controller 306 rather than each node behaving autonomously. Although controller 306 is shown as part of an edge node 304, it may reside anywhere in the system including in a 5G base station. Nodes are responsible for reporting to the controller 306 which nearby mmWave links are available and which are not. At initial setup (e.g., a bootstrapping phase), the system does a one-time scan via the data plane to get the throughputs of all the links. The throughputs are sent via the control plane to the controller 306 and stored at the end node. When the active link goes down, the controller 306 automatically picks the next best link based on the information from the initial scan. After the system starts using the second best link, if the measured throughput is different than what the upfront measurement showed, the updated and actual throughput is sent to the controller 306 through the control plane and stored in place of the outdated throughput.

For example, in FIG. 3A camera C4 316 may report to controller 306 that it is has 5 possible mmWave links, that it is using link 350 as the upstream link to connect to the edge node 304, it is connected to node C5 318 via downstream link 355 and node C9 326 via downstream link 362 and that links 352 and 364 are available. As another example, node C5 318 may report to controller 306 that it is using upstream link 355 to connect to node C4 316, it is connected to node C6 320 via downstream link 338 and to node C7 322 via downstream link 336 and that links 342 and 344 are available. The nodes C1-C11 send the link utilization/availability information over the control plane 132 (shown in FIG. 1). In aspects, the network scheduler in the controller is responsible for managing the collection of this information. In addition to reporting which neighboring links are available and which are not, a node reports over the control plane the throughput for each link it is utilizing.

In aspects, a network includes multiple edge nodes where one edge node is designated as the master edge node. Each edge node is connected to its own relay topology (e.g., routing tree) of data nodes and the edge nodes are connected together via a communication link, such as a wired or wireless network connection. The master edge node receives data streams (data packets) from data nodes not in its own relay topology through the communication link from the edge server connected to the sending data node. In aspects, the master edge node sends and receives control packets to and from data nodes outside its own relay topology in the same way. In other aspects, all data nodes are connected directly to the master edge node over the low frequency wireless network, such as the control plane 132 in FIG. 1. In this example, the master edge node sends and receives control packets directly from all data nodes via the control plane.

Figure 4:
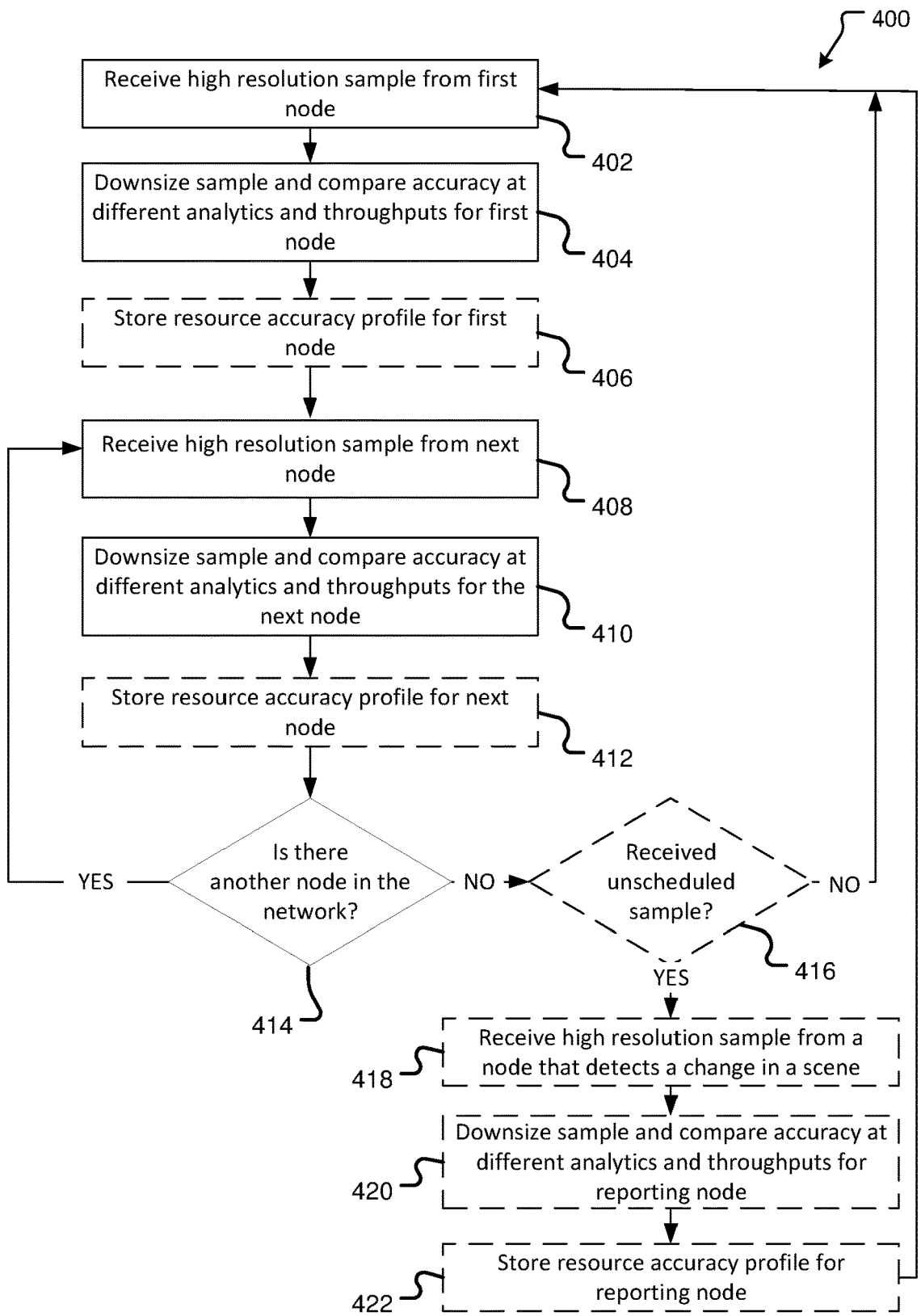
FIG. 4 illustrates an example method of determining resource accuracy profiles for network nodes in accordance of aspects of the present disclosure.

FIG. 4 illustrates an example method managing resource accuracy profiles for nodes in accordance with aspects of the present disclosure. In aspects, method 400 may be performed by network scheduler 268 of the controller 264 as shown in FIG. 2B. Network scheduler 268 schedules each node in the network to periodically send a sample of its highest resolution data stream over its current mmWave links to the controller of the master edge node in a round-robin fashion.

A general order for the operations of the method 400 is shown in FIG. 4. Generally, the method 400 starts with a start operation 402 and ends with an operation 422. The method 400 may include more or fewer steps or may arrange the order of the steps differently than those shown in FIG. 4. The method 400 can be executed as a set of computer-executable instructions executed by a computer system and encoded or stored on a computer readable medium. Further, the method 400 can be performed by gates or circuits associated with a processor, an ASIC, an FPGA, a SOC or other hardware device. Hereinafter, the method 400 shall be explained with reference to the systems, component, devices, modules, software, data structures, data characteristic representations, signaling diagrams, methods, etc. described in conjunction with FIGS. 1, 2A, 2B, 3A-3C, 5, 6A, 6B, 7, 8A, and 8B.

Method 400 begins with operation 402 where the controller receives a high resolution data stream from a first node, such as node C1 310 shown in FIG. 3A. The first node sends the highest quality data stream it is capable of sending at that time. In aspects, the first node sends the data stream sample in response to receiving a control packet over the control plane from the scheduler in the controller (not shown).

At operation 404, the controller downsizes the sample to lower quality streams and determines the relationship between accuracy, quality analytics (e.g., resolution, frame rate in the example of a video stream) and throughput at each quality level. The quality analytics or parameters (e.g. knobs) will depend on the type of data stream being sent and are collectively referred to as a knob index. The higher the knob index the higher the quality of data stream. In aspects, a knob index for video streams may factor in resolution and/or frame rate among other analytics. For example, node C1 may send a video stream at 8K resolution. The controller will downgrade the video stream to various resolutions (e.g., 4K, 1080p, and 720p) and determine the accuracy at each resolution and throughput, including the resolution and throughput of the received sample. Additionally or alternatively, the controller will vary the frame rate of the video streams and determine the accuracy and each frame rate and throughput, including those of the received sample. These determinations are referred to herein as the resource accuracy profile. In aspects, the video analytics engine 247 utilizes DNN (deep neural network) inference and non-DNN operations to determine the resource accuracy profiles. The resource accuracy profile may vary greatly depending on what is happening in the scene being imaged in the sample that is sent. For example, there may be a wide variance in accuracy rates when there is a lot of action happening in the scene. In other aspects, if minimal action is occurring in the scene, the accuracy may not change very much as resolution and/or throughput are increased.

Example Resource Accuracy Profile for Active Scene

| Knob Index | 1 | 2 | 3 | 4 |
|---|---|---|---|---|
| Resolution | 720p | 1080p | 4K | 8K |
| Throughput | 60 | 200 | 540 | 900 |
| Accuracy | 35% | 60% | 93% | 99% |

Example Resource Accuracy Profile for Quiet Scene

| Knob Index | 1 | 2 | 3 | 4 |
|---|---|---|---|---|
| Resolution | 720p | 1080p | 4K | 8K |
| Throughput | 10 | 20 | 35 | 150 |
| Accuracy | 75% | 80% | 93% | 99% |

In aspects, the video analytics engine runs a cascaded operation to determine the resource accuracy profile. A background subtraction module is first invoked on down-sampled frames as an early filter to detect changes in each frame. If this module detects motion in the "region of interest", it calls a DNN model (e.g., YOLOv3 for object detection) executing on the GPU to verify if there is indeed an object of interest. It then uses this information to more quickly and efficiently calculate the resource accuracy profile.

In aspects, operations 402 and 404 may happen only at the master edge node. However, in other aspects other edge nodes may collect data samples from their connected nodes and calculate the resource accuracy profile for each of their connected nodes. In this aspect, the other edge nodes send the resource accuracy profiles to the master edge node for storage. At optional operation 406, the resource accuracy profile is stored at the master edge node so that it may be accessed by the controller for optimization operations as described in connection with FIG. 5. Additionally, resource accuracy profiles may be stored at the edge node to which they are connected.

At operation 408, an edge node receives a high quality data sample (e.g., a high resolution video stream) from a next node in the network, such as node C2 312 in FIG. 3A. In aspects, the next node sends the stream sample in response to receiving a control packet over the control plane from the scheduler in the controller (not shown). At operation 410, the edge node calculates the resource accuracy profile for the next node as described with operation 404.

The resource accuracy profile may optionally be stored at the master edge node at operation 412.

At decision 414, it is determined whether there is another node in the network for which the edge node has not received a sample in this round of sampling. If the answer is YES, the method 400 moves to operation 408 to collect/receive a high quality sample for the next node and the flow proceeds back through operations 408-412 to decision 414 until the answer is NO—there are no nodes for which the edge node has not received a high quality sample in this round of sampling. If the answer to decision 414 if NO, the method 400 proceeds to optional decision 416 to determine whether the edge node has received any unscheduled samples from any of its connected nodes. As discussed in connection with FIG. 2, video nodes may be equipped with optional motion detectors and optional video analytics applications that allow them to detect a change in the scene they are imaging. In this scenario, the video node may send a high resolution sample to the edge node even though it was not scheduled to do so. That is, even though it did not receive a control packet over the control plane instructing it to send the high resolution sample. In this case, the answer to decision 416 is YES and method 400 proceeds to operation 418. At operation 420, the edge node downsizes the sample from the reporting node and determines the resource accuracy profile as described in connection with operation 404. At optional operation 422, this profile is stored at the master edge node (either directly or after being sent from another edge node) and the method returns back to operation 402. If the answer to decision 416 is NO, or there is no ability for the system to receive unscheduled video samples, the method returns to operation 402 to begin the round-robin sampling method 400 again. While aspects of FIG. 4 have been described with respect to the transmission of a video stream, one of skill in the art will appreciate that other types of data and data streams may be practiced with the exemplary systems and methods disclosed herein.

Figure 5:
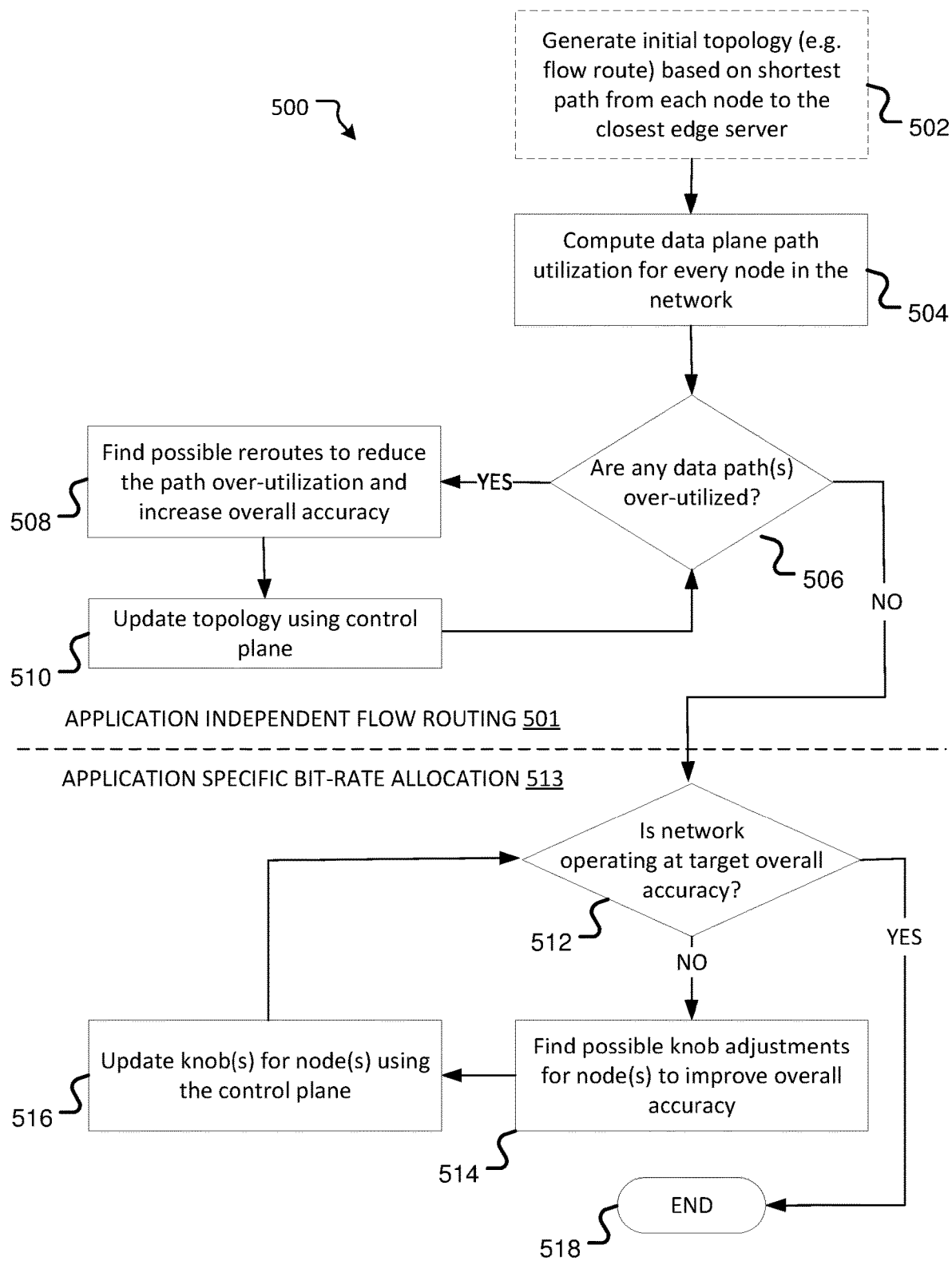
FIG. 5 illustrates an example method of determining topology/flows to optimize for data analytics accuracy in accordance of aspects of the present disclosure.

FIG. 5 illustrates an example method 500 optimizing the topology or flow control to maximize the accuracy of data analytics for nodes in network in accordance with aspects of the present disclosure. In aspects, method 500 may be performed by optimizer 270 of the controller 264 as shown in FIG. 2B. In aspects, method 500 is divided into two phases: application independent flow routing 501 (involves operations 502-510) and application specific bit-rate allocation 513 (involves operations 512-516), both of which are designed to improve the overall analytics accuracy of the network.

A general order for the operations of the method 500 is shown in FIG. 5. Generally, the method 500 starts with a start operation 502 and ends with an end operation 520. The method 500 may include more or fewer steps or may arrange the order of the steps differently than those shown in FIG. 5. The method 500 can be executed as a set of computer-executable instructions executed by a computer system and encoded or stored on a computer readable medium. Further, the method 500 can be performed by gates or circuits associated with a processor, an ASIC, an FPGA, a SOC or other hardware device. Hereinafter, the method 500 shall be explained with reference to the systems, component, devices, modules, software, data structures, data characteristic representations, signaling diagrams, methods, etc. described in conjunction with FIGS. 1, 2A, 2B, 3A-3C, 4, 6A, 6B, 7, and 8A and 8B.

At optional operation 502, the optimizer generates an initial relay topology (e.g. routing tree) based on the shortest path (fewest hops) between each node and the nearest edge node in the network. In a relay topology, not all of the data nodes are connected to an edge node. Rather, multiple data nodes are connected together in a tree-like formation to a data node that is ultimately connected to an edge node. An initial relay topology may look like the topology in FIG. 3A, where each node has at most 2 hops (e.g. connections to other data nodes) to reach the edge node 304. For example, node C8 324 has two hops (nodes C9 326 and C4 316) to reach edge node 304. Instructions for which nodes connect to which nodes are sent from the controller to each node through the control plane via control packets as discussed in connection with FIG. 1. When there are multiple edge nodes distributed over the network, method 500 builds a set of routing trees rooted at each edge node with balanced network traffic. Operation 502 generates M initial topologies (e.g. routing trees) for M edge nodes using the same shortest path algorithm described above. To balance the size (number of nodes in each tree) of M routing trees, the M edge nodes take turns to select the nodes into its routing tree based on the shortest path metric. The node selected by one edge node will not be selected by others.

At operation 504, the path utilization is calculated for each path in the initial topology. In the case where there are multiple edge nodes, the path utilization is calculated for all paths for all topologies (e.g. routing trees) in the network. In aspect, path utilization is computed by the optimizer in the controller of the master edge node. For a node, the amount of data traffic that needs to be transmitted equals the sum of its own traffic plus the traffic from all its descendent (e.g., downstream) nodes. As an example, the more downstream nodes that are connected to a node, the higher the utilization will be on that node's upstream path. In aspects, the utilization of each path should be less than 100%. Load balancing the routing over all the links/paths improves overall accuracy of the network.

Decision Operation 506 determines whether any paths are over-utilized, e.g., have a utilization of more than 100%. In aspects, a goal is to reduce bottlenecks in the system to increase overall accuracy of the system. Returning to FIG. 3A, it is likely that path 350 is over-utilized because it is transmits video streams from five nodes to the edge node 304: C5 318, C9 326, C8 324, C6 320, and C7 322. In contrast, link 332 transmits video streams from one node C2 312 to the edge node 304. If the answer to decision 506 is YES, the method proceeds to operation 508 to find possible re-routes to reduce the bottlenecks and improve overall accuracy in the topology. Method 500 alleviates radio utilization bottleneck by relocating cameras along the current maximal utilization path to other paths. For example, as shown in FIG. 3B by changing node C7 322 from using link 336 to link 354, the utilization of path 350 is decreased. Now node C7 322 is connecting to the edge node 304 through node C2 312 and C1 310 instead of through node C4 316 to edge node 304. The control plane is used to send instructions to node C7 322 to connect to node C2 312 over link 354 instead of to node C4 over link 336. Alternatively or additionally as shown in FIG. 3C, node C6 320 could be moved from link 338 to link 356, which would also cause it to connect to edge node 304 through link 332 instead of overly utilized link 350. Again, instructions for re-routing are sent via control packets over the control plane. Re-routes are selected to maximize accuracy of analytics, e.g., video detection analytics as opposed to throughput.

Once a re-route is determined at operation 508, method 500 proceeds to operation 510 to update the topology via instructions sent in control packets over the control plane and then to decision 506 to determine whether there is any path over-utilization in the new topology. If the answer is YES, the method 500 proceeds to determine another reroute, updates the topology via the control plane at operation 510 and tests for over-utilization at decision 506 until the answer is NO or it is not possible to route the network further diminish any path over-utilizations.

In networks with multiple edge nodes, operations 506, 508, and 510 are performed iteratively by the master edge node for each routing tree (e.g., relay topology) for each edge node, such that each relay topology for each edge node has no over-utilized paths or it is not possible to route the network to further diminish any path over-utilizations. In this way, the overall accuracy of both the intra-network (e.g. relay network connected to one edge node) and inter-network (all paths in the entire network comprising all edge nodes) is improved.

If the answer to decision 506 is NO, method 500 moves from the application independent flow routing phase 501 to the application specific bit-rate allocation phase 513. Decision 512 determines whether the network is operating at target overall accuracy using the resource accuracy profiles collected as described in FIG. 4. If the network is operating at target overall accuracy, (YES at 512) method 500 proceeds to the END 518. If the answer at decision 512 is NO, method 500 proceeds to find possible knob adjustments from the resource accuracy profile for a node(s) to improve the overall accuracy. In other words, throughputs may be adjusted for different nodes and different paths to increase the overall accuracy of the entire network. For example, decreasing a knob (and thereby decreasing stream quality, accuracy, and throughput) for one node may increase the overall accuracy of the network (all nodes combined). The overall accuracy determination is explained below with reference with FIGS. 6A and 6B. Method 500 finds alternate knobs for node(s) at operation 514, updates the knob at 516 via the control plane, and proceeds back to decision 514 to determine if the network is operating at target overall accuracy. If the answer is still NO, method 500 proceeds through loop 514 to 516 to 512 until the answer is YES at decision 512.

In networks with multiple edge nodes, operations 512, 514, and 516 are performed by the master edge node for the entire network, such that the overall accuracy of entire network is improved. Also in networks with multiple edge nodes, the method 500 also considers the computation capacity on each edge node (not shown). That is, each edge node needs enough compute capacity to run at the incoming rate of data that is being transmitted from the data nodes that are directly connected to it over its own relay topology.

FIGS. 6A and 6B illustrate example relay topologies for determining an overall accuracy for a network in accordance with aspects of the current disclosure. Both FIGS. 6A and 6B illustrate multi-hop relay networks 600 and 630, respectively, each of which contain four nodes C1 610, C2 612, C3 614, and C4 616 and an edge node 604. The solid unidirectional arrows designate active mmWave links as part of the data plane—each is marked with its maximum capacity. The dashed line illustrates a possible, but unutilized mmWave link. The capacity (e.g., throughput) for each link is shown in Mbps.

In FIG. 6A, node C1 610 is connected to edge node 604 via link 620, which has a throughput of 400 Mbps. Node C2 612 is connected to node C1 610 via link 622, which has a throughput of 1000 Mbps. Node C3 614 is connected to edge node 604 via link 628, which has a throughput of 1000 Mbps. Node C4 616 is connected to node C3 614 via link 626, which has a capacity of 200 Mbps. There is a possible, but unutilized link 624 between nodes C2 612 and C3 614, which has a capacity of 1000 Mbps.

Through the procedure outlined in FIG. 4, the system has determined the resource accuracy profiles for nodes C1-C4 in FIG. 6A as shown in Table 1:

TABLE 1

Resource Accuracy Profile for Nodes C1-C4

| Knob Index | 1 | 2 | 3 | 4 | 5 | 6 | 7 |
|---|---|---|---|---|---|---|---|
| Bit-rate (Mbps) | 12 | 24 | 60 | 120 | 210 | 540 | 900 |
| Accuracy | 10% | 35% | 60% | 77% | 88% | 95% | 99% |

As discussed above, the higher the knob index, the higher the analytics parameters, such as resolution and frame rate. Using the method outlined in FIG. 5, the system has set the four nodes at the following knobs, which leads to the highest overall accuracy of the entire network (all nodes combined) as shown in Table 2:

TABLE 2

| Nodes | Knob | Throughput (Mbps) | Accuracy |
|---|---|---|---|
| C1 | 4 | 120 | 77% |
| C2 | 4 | 120 | 77% |
| C3 | 5 | 210 | 88% |
| C4 | 4 | 120 | 77% |

In aspects the overall accuracy of the network may be determined by taking the average accuracy of all nodes, which in the topology of FIG. 6A is 79.75%. However, the disclosure is not limited to taking the average to determine overall accuracy. Any measure that combines that accuracies of the nodes in the network may be used including for example taking the median or mean of all accuracies or maximizing the minimum accuracy of the least accurate node.

With the knobs set according to Table 2, no path is over-utilized and the network is operating at a target average accuracy for all nodes in the network. For example, link 620 has a capacity of 400 Mbps and transmits data streams from nodes C1 610 (throughput 120) and C2 612 (throughput of 120), the sum of which is less than the capacity (400 Mbps) of link 620.

In an example, a scene change for node C4 616 in FIG. 6A may cause the resource accuracy profile to change for this node. In this example, the scene has become quiet for node C4 616 with little or no change in frames being imaged. The controller will detect this change through the procedure discussed in connection with FIG. 4. The new resource accuracy profiles for nodes C1-C4 are as shown in Tables 3 and 4:

TABLE 3

Resource Accuracy Profile for Nodes C1-C3

| Knob Index | 1 | 2 | 3 | 4 | 5 | 6 | 7 |
|---|---|---|---|---|---|---|---|
| Bit-rate (Mbps) | 12 | 24 | 60 | 120 | 210 | 540 | 900 |
| Accuracy | 10% | 35% | 60% | 77% | 88% | 95% | 99% |

TABLE 4

Resource Accuracy Profile for Node C4

| Knob Index | 1 | 2 | 3 | 4 | 5 | 6 | 7 |
|---|---|---|---|---|---|---|---|
| Bit-rate (Mbps) | 2 | 4 | 10 | 20 | 35 | 90 | 150 |
| Accuracy | 10% | 35% | 60% | 77% | 88% | 95% | 99% |

Such a change in scene causes the Bit-rate needed to transmit the data streams to go down for knob for node C4 616 as show in a comparison between Tables 3 and 4. Following the method 500 from FIG. 5, in the application specific bit-rate allocation phase 513, the system adjusts the knobs for nodes C1 610 and C4 616 as shown in Table 5 to maximize accuracy for the system for an average overall accuracy of 85.25%. The system uses the control plane to send instructions to change the knobs for nodes C1 610 and C4 614.

TABLE 5

| Nodes | Knob | Throughput (Mbps) | Accuracy |
|---|---|---|---|
| C1 | 5 | 210 | 88% |
| C2 | 4 | 120 | 77% |
| C3 | 5 | 210 | 88% |
| C4 | 5 | 35 | 88% |

As another example, in FIG. 6B the capacity of link 620 has dropped from 400 Mbps to 200 Mbps due to interference or some other problem, which causes this path to be over-utilized. This example assumes that the four nodes C1-C4 have resource accuracy profiles as shown in Table 1. Following the flow of method 500 in FIG. 5, in the application independent flow routing phase 501, the topology of the multi-hop relay network is re-routed to that of network 630. Specifically, node C2 612 is re-routed to use link 624 instead of link 622, which reduces congestion on link 620. The instructions to cause the node C2 612 to use link 624 instead of 622 are sent via control packets over the control plane as shown in FIG. 1. Next, following the method 500 from FIG. 5, in the application specific bit-rate allocation phase 513, the system then reconfigures the knobs for nodes C1 610, C2 612, and C4 616 to maximize the overall accuracy 74% as shown in Table 6:

TABLE 6

| Nodes | Knob | Throughput (Mbps) | Accuracy |
|---|---|---|---|
| C1 | 3 | 60 | 60% |
| C2 | 5 | 210 | 88% |
| C3 | 5 | 210 | 88% |
| C4 | 3 | 60 | 60% |

Figure 7:
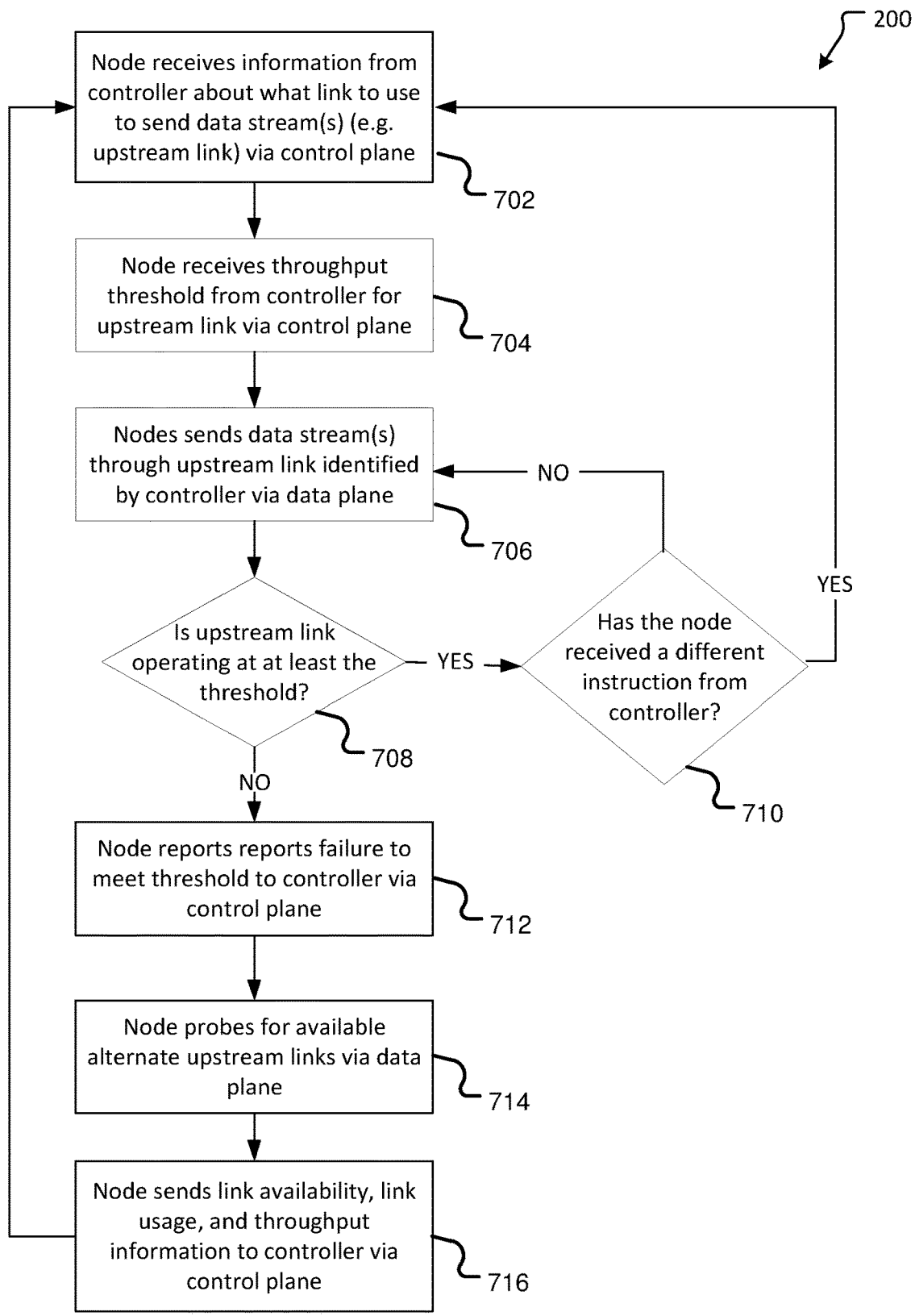
FIG. 7 illustrates a method of detecting that the system may not be operating at a target accuracy in accordance with aspects of the present disclosure.

FIG. 7 illustrates a method of detecting that the system may not be operating at a target accuracy in accordance with aspects of the present disclosure. Rather than continuously probing traffic for throughput estimation, which is expensive, the present disclosure develops a topology and flow plan for the network and lets it run until there is a problem. That is, a reactive approach to throughput estimation detects when existing links have reduced throughputs or blockage, and only then probes for new links as illustrated by method 700.

A general order for the operations of the method 700 is shown in FIG. 7. Generally, the method 700 starts with a start operation 702 and ends with an end operation 716. The method 700 may include more or fewer steps or may arrange the order of the steps differently than those shown in FIG. 7. The method 700 can be executed as a set of computer-executable instructions executed by a computer system and encoded or stored on a computer readable medium. Further, the method 700 can be performed by gates or circuits associated with a processor, an ASIC, an FPGA, a SOC or other hardware device. Hereinafter, the method 400 shall be explained with reference to the systems, component, devices, modules, software, data structures, data characteristic representations, signaling diagrams, methods, etc. described in conjunction with FIGS. FIGS. 1, 2A, 2B, 3A-3C, 4, 5, 6A, 6B, 8A and 8B.

Following the optimization method 500 of FIG. 5, at operation 702 the controller sends a network node instructions over the control plane as to what link the node should use to transmit data streams to the edge node (e.g., the upstream link). In aspects, the controller bases this information on the topology it determined would maximize overall accuracy for the network. In aspects, the controller sends this information to every node in the network.

At operation 704, the controller sends over the control plane to a network node a throughput threshold at which its upstream data link should be operating. In aspects, the controller sends this information to every node in the network.

At operation 706, the node sends data streams through the upstream link identified by the controller through the control plane in operation 702.

At decision 708, the node determines whether the upstream data link is operating at least at the threshold identified in operation 704. If the answer is YES, method 700 proceeds to decision 710 to determine whether it has received re-routing instructions from the controller. For example, even if the node's link is operating at least its threshold, there may be other problems in the overall system that might cause the controller to change the flow/topology or the node. If the answer is NO, method 700 proceeds back to operation 706 and continues to send its video stream over the upstream link as instructed by the controller over the control plane.

If however, the answer to decision 708 is NO, the node reports a failure to the controller via the control plane at operation 712. At operation 714, the node probes for additional alternate upstream links via the data plane. At operation 716, the node sends its link availability, link usage, and throughput information determined from the probe to the controller via the control plane and waits for instructions on what link to use at operation 702.

Returning to decision 710, if the answer is YES the method moves to operation 702 where the node receives instructions about what upstream link to use.

Figure 8A:
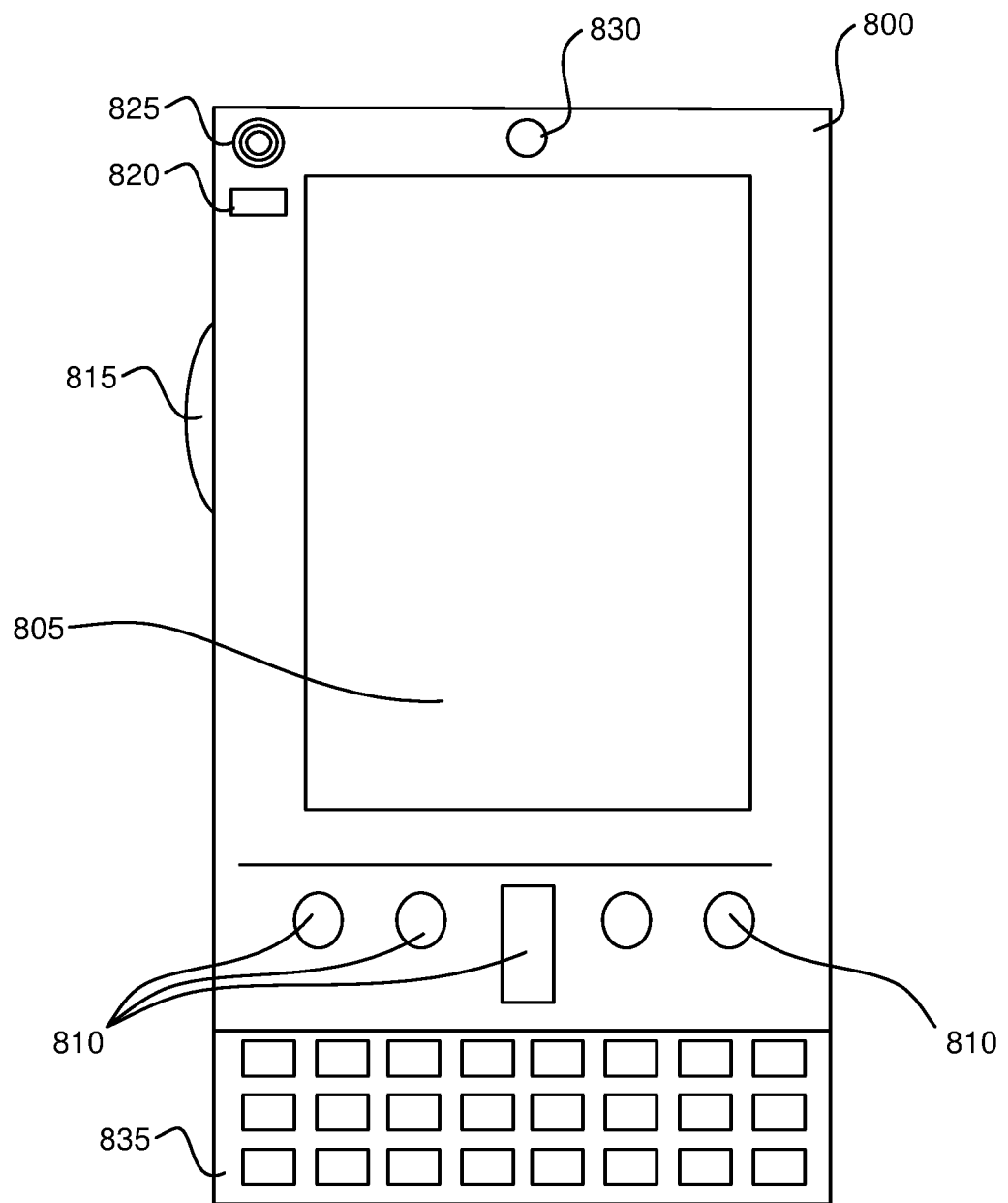
FIGS. 8A and 8B are simplified block diagrams of a mobile computing device with which aspects of the present disclosure may be practiced.
Figure 8B:
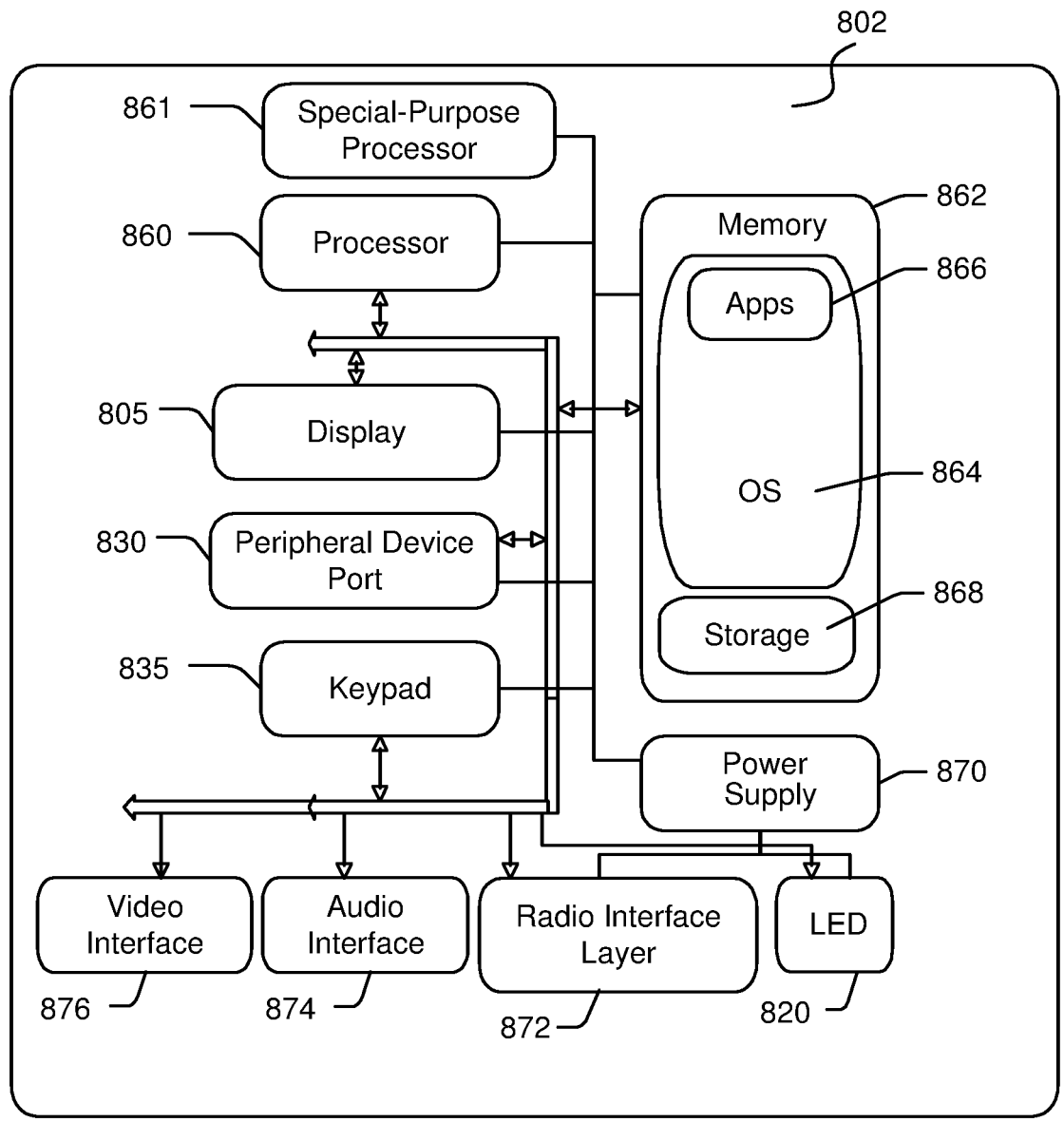

FIGS. 8A and 8B illustrate a computing device or mobile computing device 800, for example, a mobile telephone, a smart phone, wearable computer (such as a smart watch), a tablet computer, a laptop computer, and the like, with which aspects of the disclosure may be practiced. In some aspects, the client (e.g., computing systems 105 in FIG. 1) may be a mobile computing device. With reference to FIG. 8A, one aspect of a mobile computing device 800 for implementing the aspects is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included, an optional side input element 815 allows further user input. The side input element 815 may be a rotary switch, a button, or any other type of manual input element. In alternative aspects, mobile computing device 800 may incorporate more or less input elements. For example, the display 805 may not be a touch screen in some aspects. In yet another alternative aspect, the mobile computing device 800 is a portable phone system, such as a cellular phone. The mobile computing device 800 may also include an optional keypad 835. Optional keypad 835 may be a physical keypad or a "soft" keypad generated on the touch screen display. In various aspects, the output elements include the display 805 for showing a graphical user interface (GUI), a visual indicator 820 (e.g., a light emitting diode), and/or an audio transducer 825 (e.g., a speaker). In some aspects, the mobile computing device 800 incorporates a vibration transducer for providing the user with tactile feedback. In yet another aspect, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one aspect of computing device, a server (e.g., server 109 or server 104), a mobile computing device, etc. That is, the computing device 800 can incorporate a system (e.g., an architecture) 802 to implement some aspects. The system 802 can implemented as a "smart phone" capable of running one or more applications (e.g., browser, e-mail, calendaring, contact managers, messaging clients, games, and media clients/players). In some aspects, the system 802 is integrated as a computing device, such as an integrated digital assistant (PDA) and wireless phone.

One or more application programs 866 may be loaded into the memory 862 and run on or in association with the operating system 864. Examples of the application programs include phone dialer programs, e-mail programs, information management (PIM) programs, word processing programs, spreadsheet programs, Internet browser programs, messaging programs, and so forth. The system 802 also includes a non-volatile storage area 869 within the memory 862. The non-volatile storage area 869 may be used to store persistent information that should not be lost if the system 802 is powered down. The application programs 866 may use and store information in the non-volatile storage area 869, such as e-mail or other messages used by an e-mail application, and the like. A synchronization application (not shown) also resides on the system 802 and is programmed to interact with a corresponding synchronization application resident on a host computer to keep the information stored in the non-volatile storage area 869 synchronized with corresponding information stored at the host computer. As should be appreciated, other applications may be loaded into the memory 862 and run on the mobile computing device 800 described herein.

The system 802 has a power supply 870, which may be implemented as one or more batteries. The power supply 870 might further include an external power source, such as an AC adapter or a powered docking cradle that supplements or recharges the batteries.

The system 802 may also include a radio interface layer 872 that performs the function of transmitting and receiving radio frequency communications. The radio interface layer 872 facilitates wireless connectivity between the system 802 and the "outside world," via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 820 may be used to provide visual notifications, and/or an audio interface 874 may be used for producing audible notifications via the audio transducer 825. In the illustrated configuration, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with aspects of the present disclosure, the microphone may also serve as an audio sensor to facilitate control of notifications, as will be described below. The system 802 may further include a video interface 876 that enables an operation of an on-board camera 830 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 869.

Data/information generated or captured by the mobile computing device 800 and stored via the system 802 may be stored locally on the mobile computing device 800, as described above, or the data may be stored on any number of storage media that may be accessed by the device via the radio interface layer 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio interface layer 872 or via a distributed computing network. Similarly, such data/information may be readily transferred between computing devices for storage and use according to well-known data/information transfer and storage means, including electronic mail and collaborative data/information sharing systems.

As will be understood from the foregoing disclosure, one aspect of the technology relates to a computer-implemented method of optimizing data analytics accuracy in a multi-hop relay network comprising a plurality of nodes including data nodes and an edge node. The method comprises identifying, by an edge node, the plurality of nodes in a relay topology, wherein the plurality of nodes in the relay topology communicate with one another via a data plane comprising high frequency wireless links and the data nodes communicate with the edge node via a control plane comprising low frequency wireless links; determining a path utilization for the high frequency wireless links; communicating, from the edge node to a data node via the control plane, a command to change the relay topology when a high frequency wireless link is over-utilized; determining whether the relay topology is operating at a target accuracy; and adjusting a data analytics parameter for a node when it is determined that the relay topology is not operating at the target accuracy. At least one of the data nodes may be a video camera. The edge node may be a 5G base station. At least one of the data nodes may be a mobile computing device. The high frequency wireless links may be mmWave links. The low frequency wireless links may be 802.11 Wi-Fi links. The target accuracy may comprise a maximum overall average accuracy for the relay topology. In another example, the target accuracy may comprise a maximum overall median accuracy for the relay topology. The data analytics parameter may be associated with a throughput and an accuracy level. The data analytics parameter may relate to one or more of video resolution and frame rate. In another example, the method further comprises receiving, from a data node via the control plane, a report that an upstream high frequency link is not operating at a threshold level; in response to receiving the report, receiving, from the data node via the control plane, an identification of an alternate upstream high frequency link that is operating at the threshold level; and sending, to the data node via the control plane, an instruction to send data using the alternate upstream high frequency link. In another example, the method further comprises determining that a resource accuracy profile for a data node has changed; in response to determining that the resource accuracy profile for the data node has changed: determining a path utilization for the high frequency wireless links; communicating, to a data node via the control plane, a command to change the relay topology when a high frequency wireless link is over-utilized; determining whether the relay topology is operating at a target accuracy; and adjusting a data analytics parameter for a node when it is determined that the relay topology is not operating at the target accuracy. In another example, the method further comprises communicating, to a data node via the control plane, a command to change the relay topology when it is determined that the relay topology is not operating at the target accuracy.

In another aspect, the technology relates to a multi-hop relay network comprising a first set of data nodes arranged in a first relay topology, wherein the first set of data nodes communicate with one another via a first data plane comprising a first set of high frequency data links and a master edge node that communicates with one or more of the first set of data nodes via the first data plane and communicates with the first set of data nodes over a first control plane comprising a first set of low frequency wireless links. The master edge node comprises a processor; and a memory storing computer executable instructions that, when executed by the processor, cause the processor to: determine a path utilization for the first set of high frequency wireless links; communicate, to a data node in the first set of data nodes via the first control plane, a command to change the first relay topology when a high frequency wireless link of the first set of high frequency wireless links is over-utilized; determine whether the first relay topology is operating at a target accuracy; and adjust a data analytics parameter for a node when it is determined that the first relay topology is not operating at the target accuracy. In another example, the multi-hop relay network further comprises a second set of data nodes arranged in a second relay topology, wherein the second set of data nodes communicate with one another via a second data plane comprising a second set of high frequency data links and a second edge node that communicates with one or more of the second set of data nodes via the second data plane, communicates with the second set of data nodes over a second control plane comprising a second set of low frequency wireless links, and communicates with the master edge node over a communications link. The master edge node further comprises executable instructions that, when executed by the processor, cause the processor to: determine a path utilization for the second set of high frequency wireless links; communicate, to the second edge node via the communication link, a command to change the second relay topology when a high frequency wireless link of the second set of high frequency wireless links is over-utilized; determine whether the second relay topology is operating at the target accuracy; and communicate, to a second edge node via the communication link, a command to adjust a data analytics parameter for a node in the second set of nodes when it is determined that the second relay topology is not operating at the target accuracy. In another example, a data node is a video camera and the master edge node further comprises computer executable instructions that, when executed by the processor, cause the processor to: receive a high resolution video stream from the video camera via the first data plane; downsize the high resolution video stream to one or more lower resolution video streams; determine an accuracy and throughput for the high resolution video stream and the one or more lower resolution streams; and create a resource accuracy profile for the video camera based on the accuracies and the throughputs for the high resolution video stream and the one or more lower resolution streams.

In another aspect, the technology relates to a multi-hop relay network that comprises a plurality of video cameras arranged in a relay topology, wherein the plurality of video cameras communicate with one another via a first data plane comprising mmWave links and an edge server that communicates with one or more of the plurality of video cameras via the data plane and communicates with the plurality of video cameras over a control plane comprising Wi-Fi links. The edge server comprises a processor and a memory storing computer executable instructions that, when executed by the processor, cause the processor to: determine a path utilization for the mmWave links; communicate, to a video camera via the control plane, a command to change the relay topology when a mmWave link is over-utilized; determine whether the relay topology is operating at a target accuracy; and communicate, to a video camera via the control plane, a command to adjust a video analytics parameter for the video camera when it is determined that the relay topology is not operating at the target accuracy. In an example, the multi-hop relay network further comprises computer executable instructions that, when executed by the processor, cause the processor to: in response to determining that a scene has changed for a video camera, adjust a video analytics parameter for one or more of the plurality of video cameras. In another example, the multi-hop relay network further comprises computer executable instructions that, when executed by the processor, cause the processor to: in response to adjusting the video analytics parameter for the one or more of the plurality of video cameras, communicate, to a video camera via the control plane, a command to change a throughput for the video camera. In yet another example, the multi-hop relay network further comprises computer executable instructions that, when executed by the processor, cause the processor to: in response to determining that a scene has changed for a video camera, communicate, to a video camera via the control plane, a command to change the relay topology.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Any of the operations, functions, and operations discussed herein can be performed continuously and automatically.

The exemplary systems and methods of this disclosure have been described in relation to computing devices. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary aspects illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed configurations and aspects.

A number of variations and modifications of the disclosure can be used. It would be possible to provide for some features of the disclosure without providing others.

In yet another configurations, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another configuration, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another configuration, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various configurations and aspects, includes components, methods, processes, systems and/or apparatus substantially as depicted and described herein, including various combinations, subcombinations, and subsets thereof. Those of skill in the art will understand how to make and use the systems and methods disclosed herein after understanding the present disclosure. The present disclosure, in various configurations and aspects, includes providing devices and processes in the absence of items not depicted and/or described herein or in various configurations or aspects hereof, including in the absence of such items as may have been used in previous devices or processes, e.g., for improving performance, achieving ease, and/or reducing cost of implementation.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method of optimizing data analytics accuracy in a multi-hop relay network comprising a plurality of nodes including data nodes and an edge node, the method comprising:
   identifying, by an edge node, the plurality of nodes in a relay topology, wherein the plurality of nodes in the relay topology communicate with one another via a data plane comprising high frequency wireless links and the data nodes communicate with the edge node via a control plane comprising low frequency wireless links;
   determining a path utilization for the high frequency wireless links;
   communicating, from the edge node to a data node via the control plane, a command to change the relay topology when a high frequency wireless link is over-utilized;
   determining whether the relay topology is operating at a target accuracy by combining accuracies of the plurality of nodes in the relay topography; and
   adjusting a data analytics parameter for a node when it is determined that the relay topology is not operating at the target accuracy.

2. The method of claim 1 wherein at least one of the data nodes is a video camera.

3. The method of claim 1 wherein the edge node is a 5G base station.

4. The method of claim 1 wherein at least one of the data nodes is a mobile computing device.

5. The method of claim 1 wherein the high frequency wireless links are mmWave links.

6. The method of claim 1 wherein the low frequency wireless links are 802.11 Wi-Fi links.

7. The method of claim 1 wherein the target accuracy comprises a maximum overall average accuracy for the relay topology.

8. The method of claim 1 wherein the target accuracy comprises a maximum overall median accuracy for the relay topology.

9. The method of claim 1 wherein the data analytics parameter is associated with a throughput and an accuracy level.

10. The method of claim 1 wherein the data analytics parameter relates to one or more of video resolution and frame rate.

11. The method of claim 1 further comprising:
   receiving, from a data node via the control plane, a report that an upstream high frequency link is not operating at a threshold level;
   in response to receiving the report, receiving, from the data node via the control plane, an identification of an alternate upstream high frequency link that is operating at the threshold level; and
   sending, to the data node via the control plane, an instruction to send data using the alternate upstream high frequency link.

12. The method of claim 1 further comprising:
   determining that a resource accuracy profile for a data node has changed;
   in response to determining that the resource accuracy profile for the data node has changed:
      determining a path utilization for the high frequency wireless links;
      communicating, to a data node via the control plane, a command to change the relay topology when a high frequency wireless link is over-utilized;
      determining whether the relay topology is operating at a target accuracy by combining accuracies of a plurality of nodes in the relay topography; and
      adjusting a data analytics parameter for a node when it is determined that the relay topology is not operating at the target accuracy.

13. The method of claim 1 further comprising:
   communicating, to a data node via the control plane, a command to change the relay topology when it is determined that the relay topology is not operating at the target accuracy.

14. A multi-hop relay network comprising:
   a first set of data nodes arranged in a first relay topology, wherein the first set of data nodes communicate with one another via a first data plane comprising a first set of high speed wireless links;
   a master edge node that communicates with one or more of the first set of data nodes via the first data plane and communicates with the first set of data nodes over a first control plane comprising a first set of low speed wireless links, wherein the master edge node comprises:
      a processor; and
      a memory storing computer executable instructions that, when executed by the processor, cause the processor to:
         determine a path utilization for the first set of high speed wireless links;

communicate, to a data node in the first set of data nodes via the first control plane, a command to change the first relay topology when a high speed wireless link of the first set of high speed wireless links is over-utilized;

determine whether the first relay topology is operating at a target accuracy by combining accuracies of the first set of data nodes; and adjust a data analytics parameter for a node when it is determined that the first relay topology is not operating at the target accuracy.

15. The multi-hop relay network of claim 14 further comprising:

a second set of data nodes arranged in a second relay topology, wherein the second set of data nodes communicate with one another via a second data plane comprising a second set of high speed wireless links;

a second edge node that communicates with one or more of the second set of data nodes via the second data plane, communicates with the second set of data nodes over a second control plane comprising a second set of low speed wireless links, and communicates with the master edge node over a communications link;

wherein the master edge node further comprises executable instructions that, when executed by the processor, cause the processor to:

determine a path utilization for the second set of high speed wireless links;

communicate, to the second edge node via the communication link, a command to change the second relay topology when a high speed wireless link of the second set of high speed wireless links is over-utilized;

determine whether the second relay topology is operating at the target accuracy; and communicate, to the second edge node via the communication link, a command to adjust a data analytics parameter for a node in the second set of nodes when it is determined that the second relay topology is not operating at the target accuracy.

16. The computing network of claim 14 wherein a data node is a video camera and the master edge node further comprises computer executable instructions that, when executed by the processor, cause the processor to:

receive a high resolution video stream from the video camera via the first data plane;

downsize the high resolution video stream to one or more lower resolution streams;

determine an accuracy and throughput for the high resolution video stream and the one or more lower resolution streams; and create a resource accuracy profile for the video camera based on the accuracies and the throughputs for the high resolution video stream and the one or more lower resolution streams.

17. A multi-hop relay network comprising:

a plurality of video cameras arranged in a relay topology, wherein the plurality of video cameras communicate with one another via a first data plane comprising mmWave links;

an edge server that communicates with one or more of the plurality of video cameras via the data plane and communicates with the plurality of video cameras over a control plane comprising Wi-Fi links, wherein the edge server comprises:

a processor; and a memory storing computer executable instructions that, when executed by the processor, cause the processor to:

determine a path utilization for the mmWave links;

communicate, to a video camera via the control plane, a command to change the relay topology when a mmWave link is over-utilized;

determine whether the relay topology is operating at a target accuracy by combining accuracies of a plurality of nodes in the relay topography; and communicate, to a video camera via the control plane, a command to adjust a video analytics parameter for the video camera when it is determined that the relay topology is not operating at the target accuracy.

18. The multi-hop relay network of claim 17 further comprising computer executable instructions that, when executed by the processor, cause the processor to:

in response to determining that a scene has changed for a video camera, adjust a video analytics parameter for one or more of the plurality of video cameras.

19. The multi-hop relay network of claim 17 further comprising computer executable instructions that, when executed by the processor, cause the processor to:

in response to adjusting the video analytics parameter for the one or more of the plurality of video cameras, communicate, to a video camera via the control plane, a command to change a throughput for the video camera.

20. The multi-hop relay network of claim 17 further comprising computer executable instructions that, when executed by the processor, cause the processor to:

in response to determining that a scene has changed for a video camera, communicate, to a video camera via the control plane, a command to change the relay topology.

* * * * *